US011055721B2

(12) United States Patent
He

(10) Patent No.: US 11,055,721 B2
(45) Date of Patent: Jul. 6, 2021

(54) METHOD, DEVICE AND SYSTEM FOR INFORMATION VERIFICATION

(71) Applicant: Tencent Technology (Shenzhen) Company Limited, Shenzhen (CN)

(72) Inventor: Chang He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1193 days.

(21) Appl. No.: 14/444,908

(22) Filed: Jul. 28, 2014

(65) Prior Publication Data

US 2015/0120552 A1    Apr. 30, 2015

Related U.S. Application Data

(63) Continuation of application No. PCT/CN2014/077147, filed on May 9, 2014.

(30) Foreign Application Priority Data

Oct. 30, 2013 (CN) .......................... 201310530347.2

(51) Int. Cl.
*G06Q 20/42* (2012.01)
*G06Q 20/40* (2012.01)
*G06Q 20/22* (2012.01)

(52) U.S. Cl.
CPC ......... *G06Q 20/42* (2013.01); *G06Q 20/2295* (2020.05); *G06Q 20/401* (2013.01); *G06Q 20/40145* (2013.01)

(58) Field of Classification Search
None
See application file for complete search history.

(56) References Cited

U.S. PATENT DOCUMENTS 6,021,438 A * 2/2000 Duvvoori .............. G06F 21/105
709/224
6,554,184 B1 * 4/2003 Amos .................. G06Q 20/108
235/379

(Continued)

FOREIGN PATENT DOCUMENTS

CN   101162517 A    4/2008
CN   101308557 A    11/2008
(Continued)

OTHER PUBLICATIONS

Tiwari, et al (A Multi-factor Security Protocol for Wireless Payment—Secure Web Authentication Using Mobile Devices) (Year: 2011).*

(Continued)

*Primary Examiner* — Mamon Obeid
(74) *Attorney, Agent, or Firm* — Morgan, Lewis & Bockius LLP

(57) ABSTRACT

The present application discloses methods, devices and systems for information verification, and in particular for multi-user verification for transactions such as online payment transactions. An online account, such as a payment account, can be registered as a multi-user verification account, which requires at least two users to verify a transaction. After receiving a verification request from a first user, a server verifies first verification information (e.g. voiceprint information) from the first user and second verification information (e.g. voiceprint information) from the second user, so that the server may approve or deny the pending transaction in accordance with a comparison of the first and second verification information against respective verification information stored in association with the multi-user verification account.

14 Claims, 12 Drawing Sheets

(56) References Cited

U.S. PATENT DOCUMENTS

| | | | | |
|---|---|---|---|---|
| 7,685,629 B1* | 3/2010 | White | G06Q 20/3674 | 726/2 |
| 8,468,584 B1* | 6/2013 | Hansen | H04M 3/4936 | 726/7 |
| 8,887,189 B2* | 11/2014 | Beyabani | H04N 21/6377 | 725/17 |
| 9,094,388 B2* | 7/2015 | Tkachev | H04L 63/08 | |
| 9,386,006 B1* | 7/2016 | Maldaner | H04L 63/10 | |
| 9,398,012 B2* | 7/2016 | Neuman | H04L 9/30 | |
| 9,723,349 B2* | 8/2017 | Moon | H04N 21/8173 | |
| 10,044,704 B1* | 8/2018 | Freeman | G06K 9/4604 | |
| 10,142,345 B2* | 11/2018 | Bae | H04L 9/3226 | |
| 10,523,660 B1* | 12/2019 | Volkov | H04L 63/0823 | |
| 2004/0082384 A1* | 4/2004 | Walker | G07F 17/3237 | 463/40 |
| 2005/0102297 A1* | 5/2005 | Lloyd | H04L 61/1552 | |
| 2005/0154793 A1* | 7/2005 | Khartabil | H04L 65/1006 | 709/227 |
| 2005/0165684 A1* | 7/2005 | Jensen | G06Q 20/40145 | 705/44 |
| 2005/0165719 A1* | 7/2005 | Greenspan | H04L 67/14 | |
| 2005/0265318 A1* | 12/2005 | Khartabil | H04M 3/436 | 370/328 |
| 2006/0064502 A1* | 3/2006 | Nagarajayya | G06F 21/41 | 709/237 |
| 2006/0087988 A1* | 4/2006 | Martinez | H04N 7/152 | 370/261 |
| 2006/0156022 A1* | 7/2006 | Grim, III | H04L 63/08 | 713/182 |
| 2006/0253458 A1* | 11/2006 | Dixon | H04L 63/101 | |
| 2006/0253578 A1* | 11/2006 | Dixon | H04L 63/1483 | 709/225 |
| 2006/0253579 A1* | 11/2006 | Dixon | G06Q 40/00 | 709/225 |
| 2006/0253580 A1* | 11/2006 | Dixon | H04L 63/145 | 709/225 |
| 2006/0253581 A1* | 11/2006 | Dixon | G06F 16/95 | 709/225 |
| 2006/0253582 A1* | 11/2006 | Dixon | G06F 16/951 | 709/225 |
| 2006/0253583 A1* | 11/2006 | Dixon | H04L 67/02 | 709/225 |
| 2007/0000998 A1* | 1/2007 | Lu | G06K 19/07703 | 235/380 |
| 2007/0011104 A1* | 1/2007 | Leger | G06Q 20/085 | 705/77 |
| 2007/0121879 A1* | 5/2007 | McGary | H04M 15/71 | 379/218.01 |
| 2007/0143433 A1* | 6/2007 | Daigle | H04L 67/24 | 709/207 |
| 2007/0235527 A1* | 10/2007 | Appleyard | G06Q 30/0603 | 235/383 |
| 2007/0271239 A1* | 11/2007 | Zhang | G06F 16/182 | |
| 2008/0034435 A1* | 2/2008 | Grabarnik | H04L 51/04 | 726/25 |
| 2008/0084972 A1* | 4/2008 | Burke | H04L 63/102 | 379/88.02 |
| 2009/0063992 A1* | 3/2009 | Gandhi | G06Q 30/02 | 715/752 |
| 2009/0064283 A1* | 3/2009 | Chen | H04L 63/18 | 726/4 |
| 2009/0103707 A1* | 4/2009 | McGary | H04M 3/42263 | 379/218.01 |
| 2009/0132819 A1 | 5/2009 | Lu et al. | | |
| 2009/0164310 A1* | 6/2009 | Grossman | G06Q 20/3224 | 705/7.33 |
| 2010/0211503 A1* | 8/2010 | Reiss | G06Q 20/3278 | 705/44 |
| 2010/0251352 A1* | 9/2010 | Zarchy | G06F 21/10 | 726/9 |
| 2010/0311396 A1* | 12/2010 | Kim | H04W 4/24 | 455/414.1 |
| 2010/0317335 A1* | 12/2010 | Borovsky | H04L 67/125 | 455/419 |
| 2011/0213711 A1* | 9/2011 | Skinner | G06F 21/43 | 705/71 |
| 2012/0005311 A1* | 1/2012 | Livingston | H04L 63/083 | 709/219 |
| 2012/0077462 A1* | 3/2012 | Rozensztejn | H04L 29/1232 | 455/411 |
| 2012/0150737 A1* | 6/2012 | Rottink | G06Q 20/3274 | 705/40 |
| 2012/0166334 A1* | 6/2012 | Kimberg | G06Q 20/401 | 705/44 |
| 2012/0264401 A1* | 10/2012 | Hwang | H04L 63/0492 | 455/411 |
| 2013/0226799 A1* | 8/2013 | Raj | G07C 9/00 | 705/44 |
| 2013/0232073 A1* | 9/2013 | Sheets | G06Q 20/40145 | 705/44 |
| 2013/0268439 A1* | 10/2013 | Lowe | G06Q 20/4016 | 705/44 |
| 2013/0305336 A1* | 11/2013 | Konertz | G06Q 50/01 | 726/7 |
| 2014/0071224 A1* | 3/2014 | Shapiro | H04L 12/1818 | 348/14.08 |
| 2014/0114991 A1* | 4/2014 | Campbell | G06F 16/245 | 707/754 |
| 2014/0122627 A1* | 5/2014 | Arnold | H04L 51/14 | 709/206 |
| 2014/0123249 A1* | 5/2014 | Davis | H04W 12/06 | 726/5 |
| 2014/0195626 A1* | 7/2014 | Ruff | H04W 12/088 | 709/206 |
| 2014/0250018 A1* | 9/2014 | Phillips | G06Q 20/4012 | 705/72 |
| 2014/0331119 A1* | 11/2014 | Dixon | H04L 63/168 | 715/234 |
| 2014/0379576 A1* | 12/2014 | Marx | G06Q 20/35785 | 705/44 |
| 2015/0074182 A1* | 3/2015 | Jung | H04L 65/1069 | 709/203 |
| 2015/0120552 A1* | 4/2015 | He | G06Q 20/40145 | 705/44 |
| 2015/0121482 A1* | 4/2015 | Berman | H04L 63/10 | 726/5 |
| 2015/0189227 A1* | 7/2015 | Du | H04N 7/152 | 348/14.01 |
| 2015/0271791 A1* | 9/2015 | Webb | H04W 28/0215 | 370/230 |
| 2015/0282155 A1* | 10/2015 | Webb | H04W 72/0453 | 370/329 |
| 2015/0302215 A1* | 10/2015 | Hu | H04L 9/3228 | 726/30 |
| 2015/0312265 A1* | 10/2015 | Hu | H04L 63/08 | 726/7 |
| 2015/0371052 A1* | 12/2015 | Lepeshenkov | H04L 63/06 | 713/165 |
| 2016/0112389 A1* | 4/2016 | Bortolamiol | H04L 63/08 | 726/6 |
| 2016/0197918 A1* | 7/2016 | Turgeman | G06F 21/31 | 726/4 |
| 2016/0352519 A1* | 12/2016 | Brill | H04W 12/06 | |
| 2017/0149873 A1* | 5/2017 | Jang | H04N 21/4402 | |
| 2017/0155646 A1* | 6/2017 | Hooley | G06K 19/06037 | |
| 2017/0324695 A1* | 11/2017 | Fischer | H04L 51/24 | |
| 2018/0084404 A1* | 3/2018 | Gupta | H04L 51/38 | |
| 2018/0124599 A1* | 5/2018 | Werner | H04L 63/0853 | |
| 2018/0159855 A1* | 6/2018 | Ha | H04W 4/80 | |
| 2018/0343240 A1* | 11/2018 | Marchand | H04W 8/005 | |
| 2019/0126138 A1* | 5/2019 | Youm | A63F 13/65 | |
| 2019/0166092 A1* | 5/2019 | Ptalis | G06Q 10/06 | |
| 2019/0230079 A1* | 7/2019 | Chung | H04L 63/0861 | |
| 2019/0246273 A1* | 8/2019 | Zhou | H04L 63/18 | |
| 2019/0251610 A1* | 8/2019 | Chuang | G06Q 20/3274 | |
| 2019/0307278 A1* | 10/2019 | Henneli | E05C 9/08 | |

(56) References Cited

U.S. PATENT DOCUMENTS

2019/0356653 A1\* 11/2019 Li .......................... H04L 29/06
2020/0090184 A1\* 3/2020 Kallugudde ........ H04L 63/0838
2020/0092097 A1\* 3/2020 Chiu .................. G06Q 20/3678

FOREIGN PATENT DOCUMENTS

| CN | 102376049 A | 3/2012 |
| CN | 102983973 A | 3/2013 |
| CN | 103034941 A | 4/2013 |
| TW | 201329882 A | 7/2013 |

OTHER PUBLICATIONS

Tencent Technology, ISR, PCT/CN2014/077147, Aug. 12, 2014, 3 pgs.
Tencent Technology, Written Opinion, PCT/CN2014/077147, dated Aug. 12, 2014 4 pgs.
Tencent Technology, IPRP, PCT/CN2014/077147, May 3, 2016 5 pgs.

\* cited by examiner

METHOD, DEVICE AND SYSTEM FOR INFORMATION VERIFICATION

RELATED APPLICATIONS

This application is a continuation application of PCT Patent Application No. PCT/CN2014/077147, entitled "METHOD, DEVICE AND SYSTEM FOR INFORMATION VERIFICATION" filed on May 9, 2014, which claims priority to Chinese Patent Application No. 201310530347.2, "Method, Device and System for Information Verification," filed on Oct. 30, 2013, both of which are hereby incorporated by reference in their entirety.

FIELD OF THE TECHNOLOGY

The present application relates to the computer technical field, especially relates to a method, device and system for information verification.

BACKGROUND OF THE TECHNOLOGY

At the present, people usually go through a verification process for the user's identity when conducting online transactions. The user's property security is protected through using the result of identity verification to determine whether to start and/or complete a transaction. In the existing technology, the identity verification in the payment process is generally limited to providing the payment account information registered by the user and verify the corresponding preset password. In most of the information verification processes for payment, the verification is successful as long as the payment account and password submitted by the user are consistent to the account and password saved by the server; and upon successful verification, the present user is authorized to carry out the operations such as payment and deduction specifically requested by the user.

In the existing technology, in order to further guarantee payment security, "security code protection" information provided by a code generating device or object, or random verification code in a verification message sent to an authorized user's phone number can be provided by the user in general after the user submits the payment account information and password. However, if the device or object providing the "security code protection" information or the authentic user's phone is stolen by an illegitimate user, the illegitimate user can easily complete an illegal transaction after obtaining the authentic user's account and password, resulting in the property loss of the authentic user.

SUMMARY

The above deficiencies and other problems associated with the existing technology are reduced or eliminated by the method, device, and system disclosed below. In some embodiments, the present application is implemented in a computer system that has one or more processors, memory and one or more modules, programs or sets of instructions stored in the memory for performing multiple functions. Instructions for performing these functions may be included in a computer program product configured for execution by one or more processors.

One aspect of the present disclosure involves a computer-implemented method performed by a server to conduct information verification based on a multi-user verification account. The server receives a verification request from a first user, wherein the verification request comprises transaction information for a pending online transaction and first verification information, wherein the transaction information identifies a multi-user verification account specifying the first user as a primary verifier and at least one second user as at least one additional verifier for the pending online transaction, and wherein the multi-user verification account stores respective verification information for the first user and the at least one second user. In response to the verification request from the first user, the server requests additional confirmation for the pending online transaction from the at least one second user based on the multi-user verification account. The server receives second verification information from the at least one second user, wherein the second verification information is provided in response to the request for additional confirmation from the server. The server verifies the pending online transaction in accordance with a comparison of the first and second verification information against the respective verification information stored in association with the multi-user verification account.

Another aspect of the present application involves a computer system such as a server. The server comprises memory, one or more processors, and one or more program modules stored in the memory and configured for execution by the one or more processors to perform the method described herein. Another aspect of the present application involves a non-transitory computer readable storage medium having stored therein instructions, which when executed by a computer system, cause the computer system to perform the method described herein.

Some embodiments may be implemented on either the terminal side or the server side of a terminal-server network environment.

BRIEF DESCRIPTION OF THE DRAWINGS

The aforementioned features and advantages of the present application as well as additional features and advantages thereof may be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference may now be made in detail to embodiments, examples of which are illustrated in the accompanying drawings. In the following detailed description, numerous specific details are set forth in order to provide a thorough understanding of the subject matter presented herein. But it may be apparent to one skilled in the art that the subject matter may be practiced without these specific details. In other instances, well-known methods, procedures, components, and circuits have not been described in detail so as not to unnecessarily obscure aspects of the embodiments.

Figure 1:
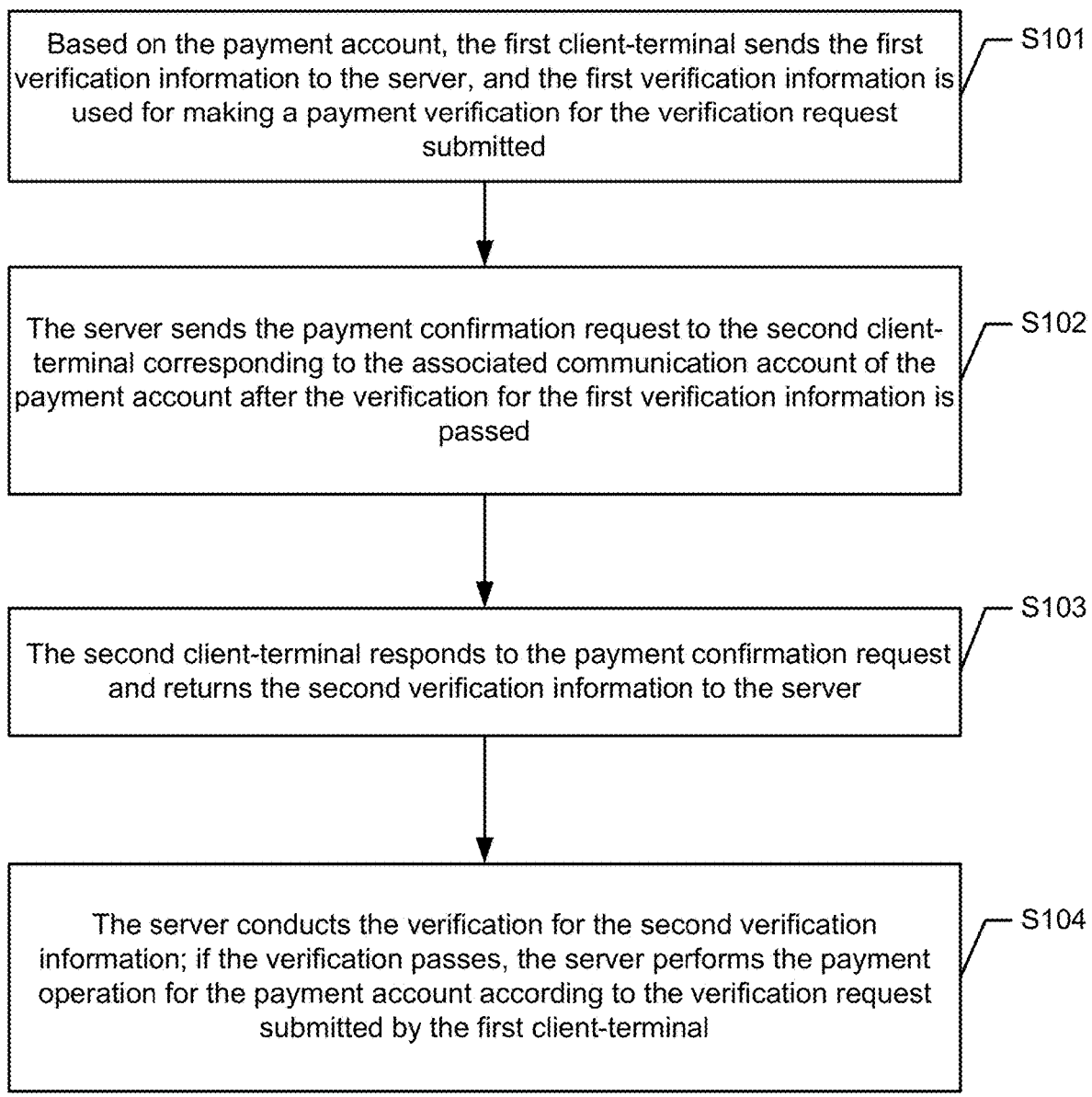
FIG. 1 is a flow chart illustrative of the information verification method according to some embodiments.

FIG. 1 is a flow chart illustrative of the information verification method according to some embodiments of the present application. In some embodiments, the method includes:

S101: Based on the payment account, the first client-terminal sends the first verification information to a server, and the first verification information is used for making payment verification for the verification request submitted.

The client-terminal may be any computing device such as mobile devices having network function such as tablet computer, smart phone, e-reader, remote control, vehicle device and wearable device; through the first client-terminal, the user can browse various e-commerce platforms and obtain relevant commodities and services.

The user of the first client-terminal completes the payment transaction through a registered payment account. The payment account in some embodiments can be a registered account for a single user or a payment account shared by multiple users. The information verification method may be used to verify the user making the transaction in both types of scenarios. In some embodiments, the first client-terminal is associated with the payment account. In some embodiments, the first client-terminal is a communication account (e.g., a user account on a social network platform) that can function as a payment account (e.g., through linking to a payment account at a financial service provider).

After obtaining the verification request from the user, the first client-terminal initiates the payment process which firstly needs the user to submit information for verification, and the payment process involving accounts transfer may be executed after passing the verification. Through the first client-terminal, the user sends the first verification information used for making payment verification for the verification request submitted to the server based on the payment account. The first verification information can include physiological biometric information related to biometrics such as but not limited to: finger print, iris, face features, voice print, nucleotides such as DNA, palm print, hand geometry, retina, and odor/scent.

S102: The server sends the payment confirmation request to the second client-terminal corresponding to the associated communication account of the payment account after the verification for the first verification information is passed.

In some embodiments, the second client terminal is a client terminal associated with another user that the user of the first client terminal has designated as a verifier for the payment transaction. In some embodiments, the second client-terminal can be associated with a communication account that has already used the payment account, e.g., when the second client-terminal has logged in an instant messaging (IM) account associated with the payment account or phone number, or when the second client-terminal has already used the associated telephone number of the payment account.

In some embodiments, when the server conducts verification for the first verification information, it firstly extracts the embedded information used for verification and conducts analysis; a simple method is verifying whether the embedded information used for verification is consistent with the saved information for this payment account in the server (or other user server) or not. If yes, the verification is passed. For example, with regard to the voice information included in the first verification information, firstly, the server extracts the voice information, obtains the voiceprint information such as frequency and amplitude of the voice information through analysis, getting the voiceprint information, compares the obtained voiceprint information with the preset voiceprint of the payment account and determines whether the verification is passed according to the comparison results; since the voiceprint information of different people are definitely different, this method can more effectively determine the current operation is the operation by an authorized user.

In some embodiments of the present application, the second verification needs to be executed after the first verification information is passed. Based on account-type, the server can determine whether the involved transaction of this payment account needs to be verified by multiple persons, or the server can check whether this payment account includes multiple associated communication accounts or not. If yes, this indicates that the involved transaction of this payment account needs to be verified by multiple persons. As used herein, the payment account that includes multiple associated communication accounts of multiple users as additional verifiers for a transaction of the payment account is a type of multi-user verification account.

In some embodiments, the S102 may include: the server conducts verification for the first verification information; if the verification is passed, the server searches for the associated communication account configured for the payment account; the server sends the payment confirmation request to the second client-terminal corresponding to the associated communication account determined by the searches.

After determining that the involved transaction of this payment account needs to be verified by multiple persons, the server searches for the associated communication account configured to be the additional verifiers for the payment account again, and the associated communication account can be the account of an instant messaging (IM) program or a phone number, or other accounts that are in controlled by the second verifier. In some embodiments, this second verifier can be a supervisor, or a guardian of child, that have the right of supervising the property of this payment account. In some embodiments, the second verifier can be the husband, wife, or friend, that jointly possess the property of this payment account. In some embodiments, the second verifier has the power to approve or deny the transaction because the first user has consented to such authorization. When the server confirms that the transaction needs to use the property in the payment account, it sends the verification request to request the second verification information.

In addition to a second verifier, the associated communication accounts may include multiple accounts corresponding to multiple verifiers. The server may send the payment verification request to more than one communication account, wherein payment confirmation request carries the payment information. The payment information is generated according to the transaction, including information such as but not limited to item description and payment amount.

S103: The second client-terminal responds to the payment confirmation request and returns the second verification information to the server.

The second client-terminal of each associated communication account may receive the corresponding payment confirmation request, and whether to consent to this payment is determined by the user of the second client-terminal based on contents of the payment confirmation request. In some embodiments, the user of the second client-terminal is available to reply with voice information through instant voice communication, or reply to the server with matching verification information for the user of the second client-terminal based on a link in payment confirmation request.

After the collection of such relevant information as voice and fingerprint, the second client-terminal returns to the server the second verification information including the collected relevant information.

S104: The server conducts the verification of the second verification information; if the verification passes, the server may perform the payment operation for the payment account according to the verification request submitted by the first client-terminal.

In some embodiments, the server verifies the second verification information based on the second verification information and through the associated communication account corresponding to the returned second verification information; if the second verification information is consistent with stored information corresponding to this associated communication account of the payment account, then it passes verification. After the second verification is passed, the server performs payment operation for the payment account based on verification request submitted by the first client-terminal, and the detailed payment process can be implemented with steps such as but not limited to fund transfer and order confirmation.

In some embodiments, it should be noted that relevant steps performed by the aforementioned first client-terminal and each second client-terminal can be achieved through adding corresponding functional modules to such applications as IM application, e-mail application and so on. In some embodiments, the first client-terminal can log in the first communication account; the second client-terminal can log in the corresponding second communication account; the first communication account and second communication account can be configured to be the associated communication accounts of the payment account in advance. When the two or more communication accounts of two or more users are linked with the payment account, the users of the two or more communication accounts are notified when a transaction of the payment account needs to be verified, and each user can provide the necessary verification information (e.g., their own voice or fingerprints). According to this implementation, when a certain party needs to execute the payment operation with the payment account, the server can execute the payment operation such as deducting money after all multiple parties corresponding to the associated communication account of this payment account pass the verification. The embodiment of the present application can also be implemented through providing a short message including a link that can link to relevant service of the server according to the methods such as short message, and the associated communication account of the payment account may be the telephone number of the corresponding user.

In some embodiments, when payment account replenishment is required, the method of the present application can also include: the server initiates the process where the sum of money is transferred to the payment account in response to the replenishment request when receiving the request for replenishing the payment account; herein, the replenishment request includes the request for transferring a certain amount into the payment account sent by the first client-terminal and/or the second client-terminal.

The initiated replenishment process includes interaction with devices such as bank server corresponding to replenishment account, update of account information of payment account and other steps including transfer prompt and verification.

In some embodiment of the present application, one or multiple associated communication accounts based on prior configuration may complete the verification for the user's payment by verifying verification information from two communication accounts; this makes the verification for the user's identity more reliable during the payment process; as long as the relevant information of one of the authentic users related to the communication accounts is not stolen, an un-authorized user cannot complete the verification of the payment account. This method is easy to be implemented in the client-terminal, is convenient for the user to complete the user verification simply and rapidly, and ensures the security of the user's payment account and property.

Figure 2:
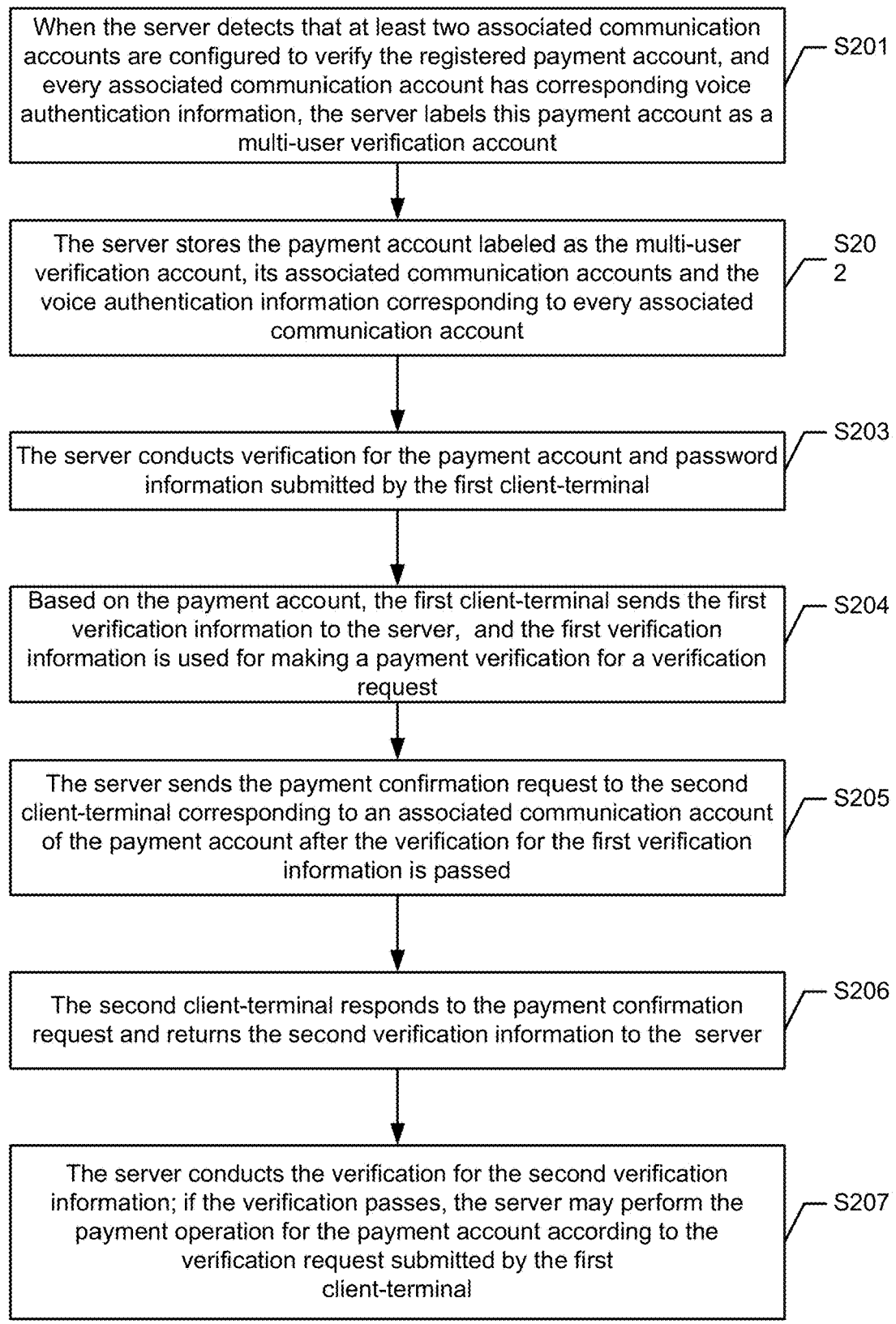
FIG. 2 is a flow chart illustrative of the information verification method according to some embodiments of the present application, showing more details.

FIG. 2 is a flowchart illustrative of the information verification method according to some embodiments, showing more details. The method can be implemented by interaction between user terminals and the server. In some embodiments, the method includes:

S201: When the server detects that at least two associated communication accounts are configured to verify the registered payment account, and every associated communication account has corresponding voice authentication information, the server labels this payment account as a multi-user verification account.

In some embodiments, each user can complete the registration of the corresponding associated communication account of the payment account and the authentication information in the server before verification. The user can also complete the registration of the corresponding associated communication account of the payment account and the authentication information in the other register servers; meanwhile, the server may identify the relevant payment account and its corresponding associated communication account and authentication information, and completes the labeling of such payment accounts according to these.

S202: The server stores the payment account labeled as the multi-user verification account, its associated communication accounts and the physiological biometric information (e.g., voice authentication information) corresponding to the respective user of every associated communication account.

The server can store the payment account, its associated communication accounts and the authentication information corresponding to every associated communication account in the form of a mapping table, so that it can directly find the associated communication account and the authentication information corresponding to every associated communication account upon verification through searching the table.

The aforementioned is the registration process of the relevant information of payment account in the server in some embodiments of the present application. This registration process can be completed at any time before the payment account initiates payment. Based on this registration, the server completes the following relevant steps in accordance with some embodiments.

S203: The server conducts verification for the payment account and password information submitted by the first client-terminal.

In some embodiments, when the user of the first client-terminal selects to purchase a certain commodity or service, the user can submit the corresponding payment account and password information to be used for completing this payment to the server; the server may firstly conduct initial verification for the payment account and password submitted by the first client-terminal. After this initial verification is passed, the server then triggers the first client-terminal to submit the first verification information—execute the following S204. If this initial verification is not passed, the server normally sends a prompt message that the input payment account or password is wrong. In some embodiments, the server may prompt the user to enter the payment account and password information again. The server can trigger the client-terminal to display a first verification information obtaining interface through sending a first verification request, so that the user can input the verification information used for the first verification in this first verification information obtaining interface. An exemplary screen shot of this first verification information obtaining interface is shown in FIG. 3A.

Figures 3A, 3B:
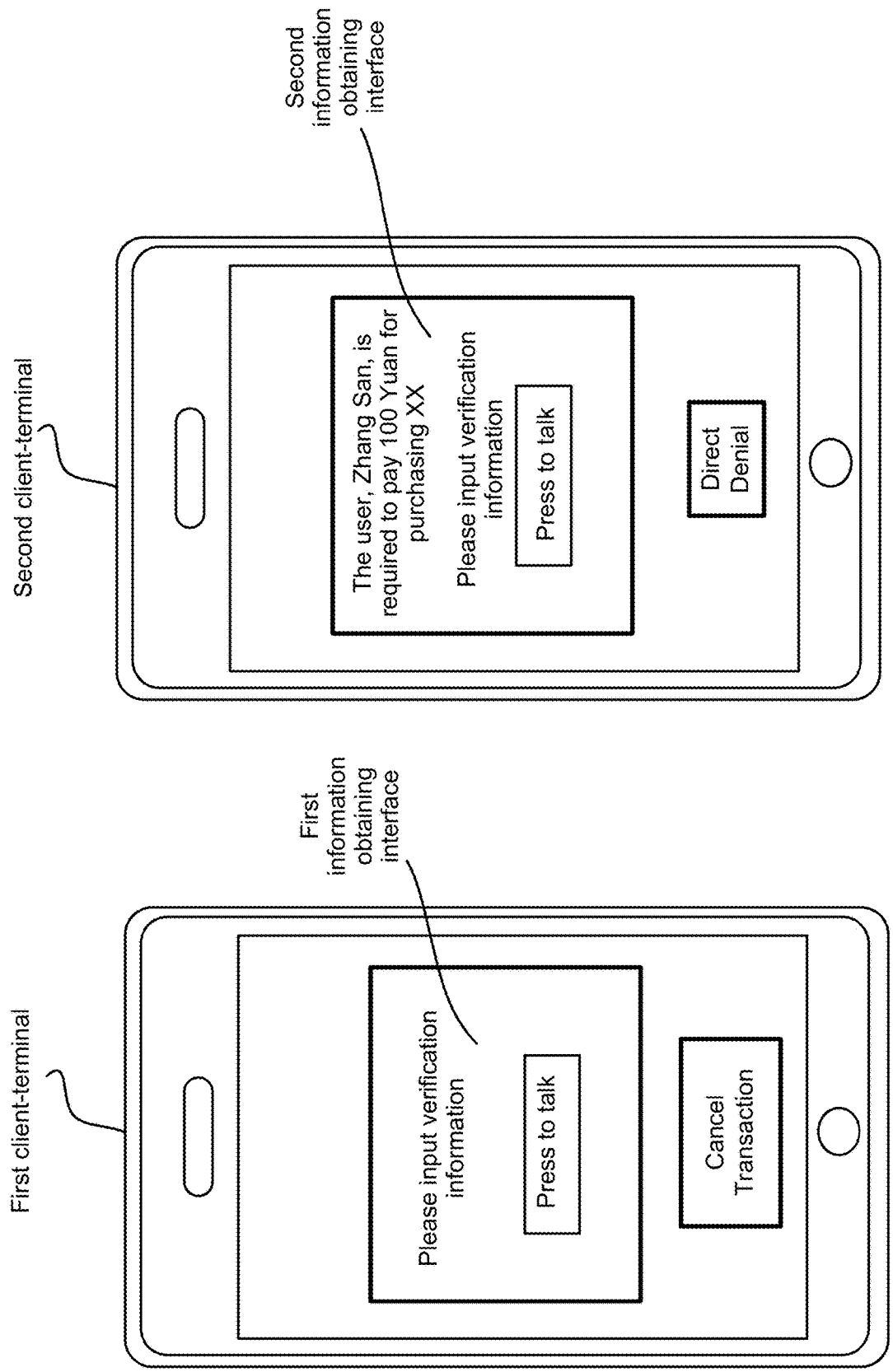
FIGS. 3A and 3B are exemplary user interfaces of the first client-terminal and second client-terminal during the verification process according to some embodiments.

As shown in FIG. 3A, the first client-terminal may display a first information obtaining interface, which may prompt the user of the first client-terminal to input verification information. Here, the input verification information is voice information; thus, the first information obtaining interface is prompting the user to "Press to talk," so that the first client-terminal may gather the voice information from the user. In some embodiments, the first client-terminal may analyze the voice information and extract the voiceprint information and send the voiceprint to the server as the first verification information. In some embodiments, the first client-terminal may simply send the voice information to the server as the first verification information so that the server may extract the voiceprint information. It should also be noted that the verification information may be other types of information. In some embodiments, the verification information may be biometric information, such as but not be limited to information related to: finger print, iris, face features, nucleotides such as DNA, palm print, hand geometry, retina, and odor/scent. For example, the first information obtaining interface may prompt the user to "scan left index finger fingerprint," so that the user may use the first client-terminal or any associated device to scan the designated fingerprint. In some embodiments, as shown in FIG. 3A, the first client-terminal may further display a "Cancel Transaction" button, allowing the user of the first client-terminal to cancel the transaction without entering the verification information. It should be noted that the specific design of the display of the first client-terminal may vary according to a default design and configurations by the user.

S204: Based on the payment account, the first client-terminal sends the first verification information to the server, and the first verification information is used for making a payment verification for a verification request.

In some embodiments, after the aforementioned first client-terminal receives the verification information that the user inputs, it generates the first verification information and sends the first verification information to the server, so as to make the server to verify it. In some embodiments, the first client-terminal can send the verification information to the server through a computer network, a communication network and other ways. In some embodiments, the verification information entered by the user may be pre-processed by the first client-terminal to become the first verification information that is sent to the server. For example, the user may enter voice information and the first client-terminal may gather such voice information with a microphone; thereafter the voice information may be pre-processed to generate voiceprint information that is the first verification information to be sent to the server. On the other hand, the voice information gathered by the first client-terminal may be directly sent to the server as the first verification information, and the server may process the voice information to obtain voiceprint information.

S205: The server sends the payment confirmation request to the second client-terminal corresponding to an associated communication account of the payment account after the verification for the first verification information is passed, wherein the second client-terminal is corresponding to the associated communication account of the payment account.

In some embodiments, the server may extract and analyze the verification information included in the first verification information. In some embodiments, the server may use the first verification information directly for verification. Then, the server may compare the verification information with the stored respective verification information of this first client-terminal registered for this payment account. If the two sets of information are the same, the verification passes; otherwise, the verification fails and the server sends an error message. In some embodiments, the first verification information may include first voiceprint information, the verification of the server for the first verification information may include: the server compares the first voiceprint information with respective voiceprint information stored with the server in association with the payment account.

In some embodiments, the step S205 can include: the server conducts verification for the first verification information; if the verification is passed, the server searches for the associated communication account configured for the payment account; the server sends the payment confirmation request to the second client-terminal corresponding to the associated communication account determined by searches.

In some embodiments, the server may search from the aforementioned content stored in S201 and S202. As searching for the associated communication account registered for the payment account from the S205, the step may include: the server searches for the associated communication account(s) registered for the payment account; the server identifies the voice authentication information of the associated communication account found according to the first voice information, deletes the account corresponding to the first voice information from the associated communication accounts found, and takes the remaining associated communication account(s) as the associated communication account(s) determined by the searches.

S206: The second client-terminal responds to the payment confirmation request and returns the second verification information to the server.

After the second client-terminal receives the request for payment confirmation, the second client-terminal may display the corresponding inputting interface; this inputting interface may display the payment information and the interface for requesting to input the verification information. An exemplary user interface of the second client-terminal displaying the inputting interface is shown in FIG. 3B.

As shown in FIG. 3B, the second client-terminal may display a second information obtaining interface, which may prompt the user of the second client-terminal to input verification information. Here, the input verification information is voice information; thus, the second information obtaining interface is prompting the user to "Press to talk," so the second client-terminal may gather the voice information from the user. As indicated above for FIG. 3A, the verification information may be other types of information and the specific prompting language can vary. In addition to the prompt to enter verification information, the second information obtaining interface may also display the payment information, including any one or a combination of the information items such as: the name and/or identification symbol, such as a nickname, of the user of the first client-terminal, the price of the merchandise and/or service to be purchased, and the name, source, item number, and/or brief description of the merchandise and/or service to be purchased. Such information may also allow the second user of the second client-terminal to determine whether the transaction should be approved. In some embodiments, as shown in FIG. 3B, the second client-terminal may further display a "Direct Denial" button, allowing the user of the second client-terminal to deny transaction without entering the verification information. In this case, the user may approve the transaction by inputting the verification information. However, it can also be set up so that even when the user of the second client-terminal wants to deny the transaction, he/she still needs to enter the verification information, just as when he/she wants to approve the transaction. In that case, the second client-terminal may display two buttons: "Press to talk and approve," and "Press to talk and deny." It should be noted that the specific design of the display of the second client-terminal may vary according to a default design and configurations by the user.

S207: The server conducts the verification for the second verification information; if the verification passes, the server performs the payment operation for the payment account according to the verification request submitted by the first client-terminal.

The specific implementation of S206 and S207 may refer to the corresponding steps in FIG. 1, as described above, and redundant descriptions are avoided.

Optionally, in some embodiments, the methods may also include: the server may send information related to the cause of verification failure to the first client-terminal in case of verification failure of the server for the first verification information or the second verification information.

In some embodiments, when the verification for the second verification information fails, the server may inform the first user of the first client-terminal that the reason for the verification failure is that the second user doesn't finish the verification or the verification is incorrect, so that the first user may act accordingly.

In addition, when payment account replenishment is required, the method of the present application can also include: the server initiates the process where the sum of money is transferred to the payment account in response to the replenishment request when receiving the request for replenishing the payment account; herein, the replenishment request includes the request for transferring amount into the payment account sent by the first client-terminal and/or the second client-terminal.

The initiated replenishment process includes interaction with such equipment as bank server corresponding to a replenishment account, update of account information of payment account and other steps including transfer prompt and verification.

In some embodiments of the present application, one or multiple associated communication accounts based on registration and/or configuration may complete the verification for the user's payment through at least two verification processes based on information from at least two respective users. This makes the verification for the user's current identity more reliable during the payment process; as long as the relevant information of one authentic user is not stolen, an un-authorized user cannot complete the verification of the payment account. The current method is easy to implement in the client-terminal, is convenient for the user to complete the safe and reliable user verification simply and rapidly, and ensures the security of the user's payment account and property.

Figure 5:
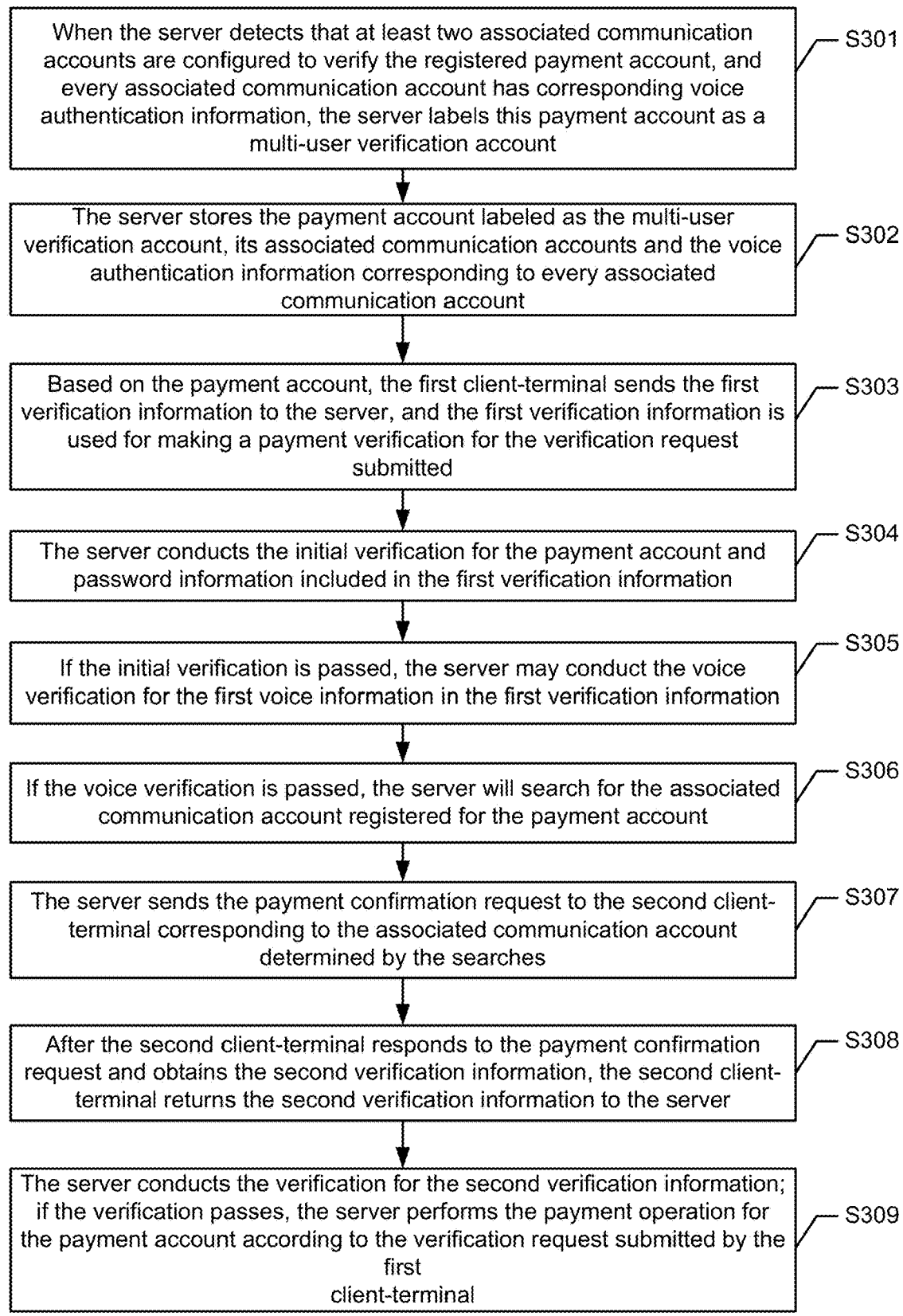
FIG. 5 is a flow chart illustrative of the information verification method according to some embodiments.

Referring to FIG. 5, which is a flow chart illustrative of the information verification method according to some embodiments of the present application. In some embodiments, the methods of the present application can be implemented by interaction between user terminals and a server. In some embodiments, the methods include:

S301: When the server detects that at least two associated communication accounts are configured to provide verification for the registered payment account, and each associated communication account has corresponding voice authentication information, the server labels this payment account as a multi-user verification account.

In some embodiments, the user can complete the registration of the corresponding associated communication account of the payment account and the authentication information in a server running the communication application. The user can also complete the registration of the corresponding associated communication account of the payment account and the authentication information in the other register servers. Meanwhile, the server conducting the verification may obtain the relevant payment account and its corresponding associated communication account and authentication information, and completes the labeling of such payment accounts according to these.

S302: The server stores the payment account labeled as the multi-user verification account, its associated communication accounts and the voice authentication information corresponding to every associated communication account. The users of the associated communication accounts may serve as verifiers for the multi-user verification account.

The server can store the payment account, its associated communication accounts and the authentication information corresponding to every associated communication account in the form of a mapping table, so that the server can directly find out the associated communication account and the authentication information corresponding to each associated communication account upon verification through searching the table in the follow-up.

In some embodiments, the aforementioned is the registration process of the relevant information of payment account in the server in some embodiments. This registration process can be completed at any time before the payment account initiates payment. Based on this registration, the server may complete the steps associated with verification of the payment account.

S303: Based on the payment account, the first client-terminal sends the first verification information to the server, and the first verification information is used for making payment verification for the verification request submitted.

In some embodiments, the first verification information submitted by the first client-terminal includes voice verification information, payment account and password information that the first client has currently used for login. In other words, the first client-terminal may submit the verification information and payment account and password together with the first verification information, without any prompting from the server.

S304: The server conducts the initial verification for the payment account and password information included in the first verification information.

The server may verify if the payment account and password are in accordance with the pre-registered or pre-configured information; if yes, the verification passes and the server may execute the following S305; if no, the server sends out the failure prompt.

S305: If the initial verification is passed, the server may conduct the voice verification for the first voice information in the first verification information.

S306: If the voice verification is passed, the server may search for the associated communication account registered for the payment account.

The verification process of the server is to extract and analyze the verification information included in the first verification information, then compare with the stored verification information of this first client-terminal registered for this payment account. If the two sets of information are consistent, the verification passes; otherwise, the verification fails and the server sends out an error message. In some embodiments, the first verification information includes the first voice information, the verification of the payment account with the first verification information may include: verification of the first voice information in the first verification information by the server for the first client-terminal.

S306 may include: the server searches for the associated communication account registered for the payment account; the server identifies the voice authentication information of the associated communication account found according to the first voice information; the server deletes the account corresponding to the first voice information from the associated communication accounts found; and the server takes the remaining associated communication account as the associated communication account determined by searches.

S307: The server sends the payment confirmation request to the second client-terminal corresponding to the associated communication account determined by the searches.

S308: After the second client-terminal obtains the second verification information, the second client-terminal returns the second verification information to the server in response to the payment confirmation request.

After the second client-terminal receives the request of the payment confirmation, it may display the corresponding inputting interface; this inputting interface may display the related issues of this payment confirmation request and the interface for requesting to input the verification information, wherein FIG. 3B may show an example of the display by the second client-terminal before the verification information is entered.

S309: The server conducts the verification for the second verification information; if the verification passes, it may perform the payment operation for the payment account according to the verification request submitted by the first client-terminal.

The specific implementation of the S308 and S309 may refer to the corresponding implementations in the aforementioned FIG. 1, and redundant descriptions are avoided.

Optionally, in some embodiments, the methods may also include: the server may send information related to the cause of verification failure to the first client-terminal in case of verification failure of the server for the first verification information or the second verification information.

In some embodiments, when the verification for the second verification information fails, the server may inform the first user of the first client-terminal that the reason for the verification failure is that the second user doesn't finish the verification or the verification is incorrect, so that the first user may act accordingly.

In addition, when payment account replenishment is required, the method of the embodiment of the present application can also include: the server initiates the process where the sum of money is transferred to the payment account in response to the replenishment request when receiving the request for replenishing the payment account; herein, the replenishment request includes the request for transferring amount into the payment account sent by the first client-terminal and/or the second client-terminal.

The initiated replenishment process includes interaction with such equipment such as bank server corresponding to replenishment account, update of account information of payment account and other steps including transfer prompt and so on.

In some embodiments of the present application, one or multiple associated communication accounts based on registration and/or configuration may complete the verification for the user's payment through at least two verification processes based on information from at least two respective users. This makes the verification for the user's current identity more reliable during the payment process; as long as the relevant information of one authentic user is not stolen, an un-authorized user cannot complete the verification of the payment account. The current method is easy to implement in the client-terminal, is convenient for the user to complete the safe and reliable user verification simply and rapidly, and ensures the security of the user's payment account and property.

Figure 6:
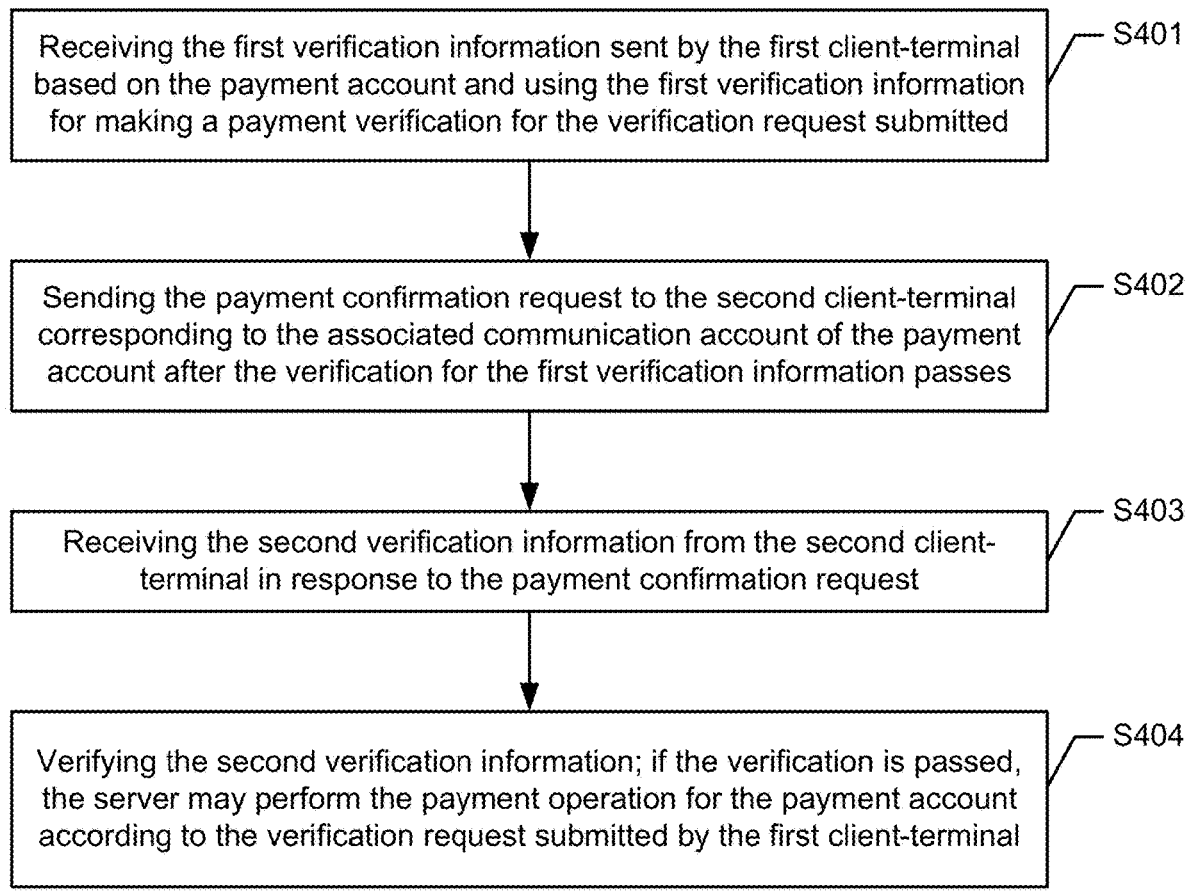
FIG. 6 is a flow chart illustrative of the information verification method as performed by a server according to some embodiments.

Referring to FIG. 6, which is a flow chart illustrative of the information verification method as performed by a server according to some embodiments of the present application. In some embodiments, the methods in the present application may include:

S401: Receiving the first verification information sent by the first client-terminal based on the payment account and using the first verification information for making payment verification for the verification request submitted.

The first client-terminal can be any computing device such as mobile devices having network functions, such as tablet computers, telephones, e-readers, remote controls, vehicle devices and wearable devices; through the first client-terminal, the user can browse various e-commerce platforms and obtain relevant commodities and services.

The user of the first client-terminal completes the payment transaction through the registered payment account.

The payment account in the present application can be a common registered account for a single user or a payment account that can be verified by multiple users. In some embodiments, the first client-terminal and the second client-terminal may be the same device or terminal. In some embodiments, the first client-terminal and the second client-terminal may be different devices or terminals.

After obtaining the verification request from the user, the first client-terminal initiates the payment process which firstly needs the user to submit information for verification, and the payment process involving account transfer may be executed after verification passes. Through the first client-terminal, the user sends the first verification information used for making verification, such as payment verification for a financial transaction, for the verification request submitted to the server based on the payment account. Among which, the first verification information can include information such as voice information and fingerprint information.

The server may receive the first verification information sent by the first client-terminal through computer network or communication network. The first verification information may directly include the verification information of voice information or fingerprint information, etc. and the payment account and its password, so that the server may directly execute the verification for the verification information as well as the payment account and its password; the server may also trigger the first verification information carried with the verification information sent by the first client-terminal after the server firstly verifies the payment account based on the payment account's password sent by the first client-terminal.

Before the step S401, the server may also execute the following steps:

When the server detects that at least two associated communication accounts are registered to verify a payment account, and every associated communication account has the corresponding voice authentication information, the server labels this payment account as a multi-user verification account.

The server stores the payment account labeled as the multi-user verification account, its associated communication accounts and the respective voice authentication information corresponding to every associated communication account.

S402: The server sends the payment confirmation request to the second client-terminal corresponding to the associated communication account of the payment account after the verification for the first verification information passes.

After the verification passes, the server may conduct verification of the verification request using the associated communication accounts and respective voice authentication information corresponding to each associated communication account.

In some embodiments, the step S402 may include: the server searches for the associated communication accounts registered for the payment account; the server identifies the voice authentication information of at least one of the associated communication account found according to the first voice information; the server deletes the account corresponding to the first voice information from the associated communication account, and takes the deleted associated communication account as the associated communication account as the second verifier. The server then sends the payment confirmation request to the second client-terminal corresponding to the associated communication account.

The verification by the server may refer to the description of the aforementioned embodiments, and redundant descriptions may be avoided.

S403: Receiving the second verification information from the second client-terminal in response to the payment confirmation request.

S404: Verifying the second verification information; if the verification is passed, the server performs the payment operation for the payment account according to the verification request submitted by the first client-terminal.

The specific implementation of the S403 and S404 may refer to the description of the corresponding embodiments in the aforementioned FIG. 1 and FIG. 5, and redundant descriptions may be avoided.

In some embodiments, when the verification for the second verification information fails, the server may inform the first user of the first client-terminal that the reason for the verification failure is that the second user does not finish the verification or the verification is incorrect, so that the first user may act accordingly.

In addition, when the payment account replenishment is required, the method of the embodiment of the present application can also include: the server initiates the process where the sum of money is transferred to the payment account in response to the replenishment request when receiving the request for replenishing the payment account; herein, the replenishment request includes the request for transferring amount into the payment account sent by the first client-terminal and/or the second client-terminal.

In some embodiments of the present application, one or multiple associated communication accounts based on registration and/or configuration may complete the verification for the user's payment through at least two verification processes based on information from at least two respective users. This makes the verification for the user's current identity more reliable during the payment process; as long as the relevant information of one authentic user is not stolen, an un-authorized user cannot complete the verification of the payment account. The current method is easy to be implemented in the client-terminal, is convenient for the user to complete the safe and reliable user verification simply and rapidly, and ensures the security of the user's payment account and property.

Figure 7:
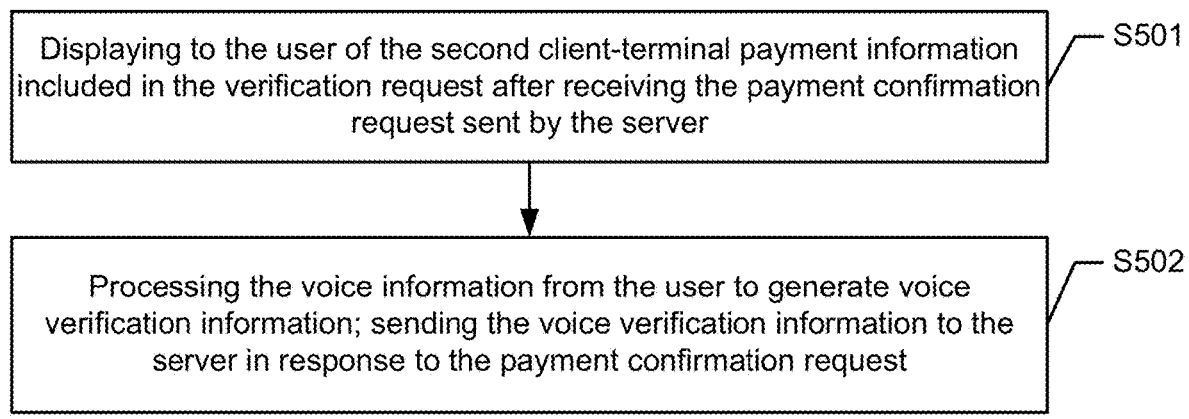
FIG. 7 is a flow chart illustrative of the information verification method as performed by a second client terminal according to some embodiments.

Referring to FIG. 7, which is a flow chart illustrative of the information verification method as performed by a second client terminal according to some embodiments of the present application. The method of the present application may include:

S501: Displaying to the user of the second client-terminal payment information included in the verification request after receiving the payment confirmation request sent by the server.

The client-terminal of the embodiment of the present application is the aforementioned second client-terminal involved. The server sends this payment confirmation request so as to obtain the verification information taken as the second verification information, the process may refer to the description of the embodiments corresponding to the aforementioned FIG. 1, FIG. 2, FIG. 5, and FIG. 6.

S502: Processing the voice information from the user to generate voice verification information; sending the voice verification information to the server in response to the payment confirmation request.

The client-terminal may prompt the user of the payment issue information included in the payment confirmation request through an interface, also request the user to input the relevant verification information such as voice information, etc. After it obtains the relevant verification information, the second client-terminal may send the second verification information to the server through computer network or communication network, so as to facilitate the server to complete the verification.

In some embodiments of the present application, one or multiple associated communication accounts based on registration and/or configuration may complete the verification for the user's payment through at least two verification processes based on information from at least two respective users. This makes the verification for the user's current identity more reliable during the payment process; as long as the relevant information of one authentic user is not stolen, an un-authorized user cannot complete the verification of the payment account. The current method is easy to be implemented in the client-terminal, is convenient for the user to complete the safe and reliable user verification simply and rapidly, and ensures the security of the user's payment account and property.

Figure 8:
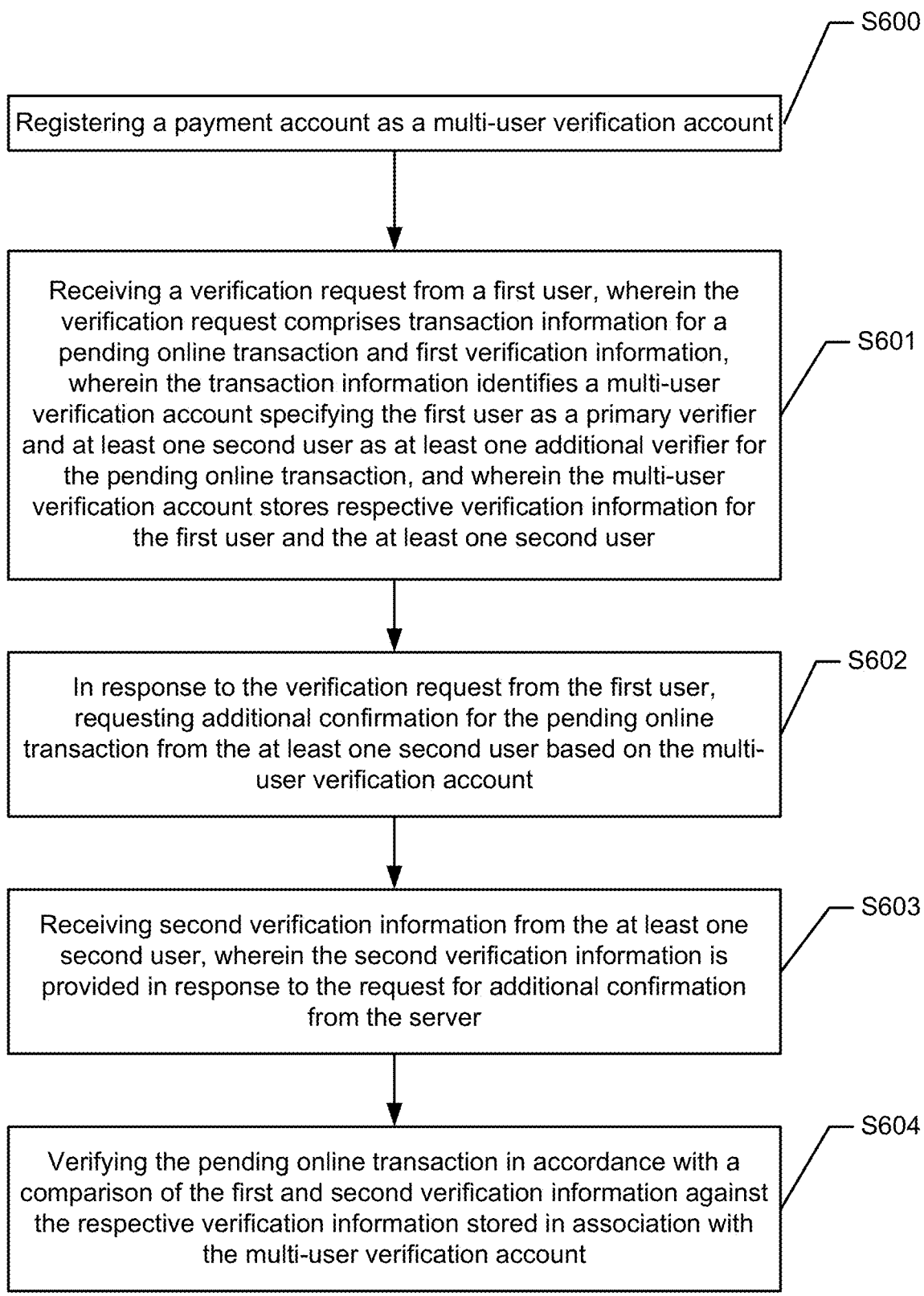
FIG. 8 is a flow chart illustrative of the information verification method as performed by a server according to some embodiments.

Referring to FIG. 8, which is a flow chart illustrative of the information verification method as performed by a server according to some embodiments.

As shown in step 600, the server may register a payment account as the multi-user verification account. The registration of the multi-user verification account may be a process that requires a number of information exchanges between the server and users of a first client-terminal and at least one second client-terminal.

The multi-user verification account refers to an account that requires more than one layer of verification. In some embodiments, the multi-user verification account requires verification from different users. In some embodiments, the multi-user verification account may be a payment account and a user may be a person authorized to access the payment account. The payment account may be a bank account of other account types that can transfer and receive funds. The payment account may be associated with a communication account established with a communication service provider (e.g., a social network service provider), and can be accessed via a communication software (e.g., a social network client application, or instant messaging application). In some embodiments, the payment account and the communication account may be a same account having multiple functions. The payment account and/or the communication account may also be associated with a terminal device. The user of the payment account (multi-user verification account after registration) may also be the user of the communication software. In some embodiments, the users are persons having biometric characteristics. In addition to accounts related to financial transactions, the multi-user verification account may be any account that requires a higher level of security. A payment account and a financial transaction may serve as examples to show how the multi-user verification account may be registered and how a verification process can be carried out for an online transaction.

To initiate the registration process, a first user of the payment account may send a registration request to the server, requesting the server to register the payment account as a multi-user verification account. The registration request may or may not include a number of information items such as but not be limited to: information related to the payment account so that the payment account can be identified, information related to a primary communication account associated with the payment account such as the related communication accounts, designation of a first user as a first verifier, designation of a second user who can serve as a second verifier or a number of users who can serve as alternative second verifiers, respective verification information for the first user, and an authentication code for the second user.

In some embodiments, the registration request may include any one or a combination of information items. For example, the registration request may include first registration information comprising the respective verification information used to verify the first verification information received from the first user. In some embodiments, the information items may be replaced or modified. For example, instead of designating one or more second verifiers by the first user, the second verifiers may be selected by the server through certain preset procedures. For instance, for the communication program running the communication accounts, some communication accounts may be set as "good friends" or "buddies" or various other categories that may entail special relationships, whereas such communication accounts may be used by the server to identity the users as valid second verifiers. The server may select one or a number of such associated communication accounts and their users as the second verifiers. The selection may be a random process or may be based on a preset rule. For example, the server may select accounts and users only from the category "family members," or from the category "parents," when such categories exist. In some embodiments, the server may select one more communication accounts from the contact list of the first user's communication account. Subsequently, the server may set the users of the selected communication accounts as additional verifiers or allow the first user to choose from the selections.

In some embodiments, the step of initiating registration may include more than one exchange between the server the first user. For example, the server may receive a registration request from a first user, wherein the registration request only indicates that the user wishes to register the payment account as a multi-user verification account. Then the server may send out prompting messages and information requests to the terminal so that the user may make selection and/or input information to advance the registration process. For example, the server may first ask the first user to designate which payment account is to be registered; the server may also ask the first user to designate one or more other users as the verifier; the server may also request the first user to choose the form of verification information, e.g. fingerprint or voice print; and the server may further prompt the user to enter the verification information. In some embodiments, when the server selects the second verifier, the server may ask the first user to confirm that the server's selections are acceptable. In some embodiments, the server may provide a list of identified candidates, e.g. from the first user's contact list or a specific category of contacts, and ask the first user to select one or more from the list as the second verifier(s). The list may be presented to the first user as a chart or a drop-down menu in the first client-terminal.

In some embodiments, the server may also determine whether the designated verifiers by the first user are eligible. For example, the server may follow a predetermined rule that the verifiers are distinct persons from the first user. To determine that a verifier is a person, the server may request the verifier to enter physiological biometric information indicating a person being present. To determine whether the verifier is distinct from the first user, the server may compare historical data related to the verifier and the first user. For example, the server may reject any request that indicates that first user and the verifier are using the same terminal device or are the same person. In addition, the server may profile the browser and/or communication history of the first user and the verifier to identify suspicious patterns. In some embodiments, the server may reject any verifier or first user that has a browsing or communication history—history using the communication software—for less than a certain period, e.g. three days, or a browsing or communication history that is scanty, e.g. less than 10 logins within the past 30 days. In general, the server may set any criteria for the eligibility of the verifier.

After receiving the registration request, the server may store the respective verification information included in the registration request from the first user so future verification information submitted by the first user may be compared with the stored information. In some embodiments, the server may save the first registration information entered by the first user in association with the multi-user verification account. In addition, the server may send a registration confirmation request to one or more of the second verifiers designated by the first user or selected by the server.

In some embodiments, in response to the registration request from the first user, the server may contact at least one second user to obtain second registration information from the at least one second user. In some embodiments, the second registration information comprises the respective verification information used to verify the verification information submitted by the second user during a later verification for a transaction.

Figure 4B:
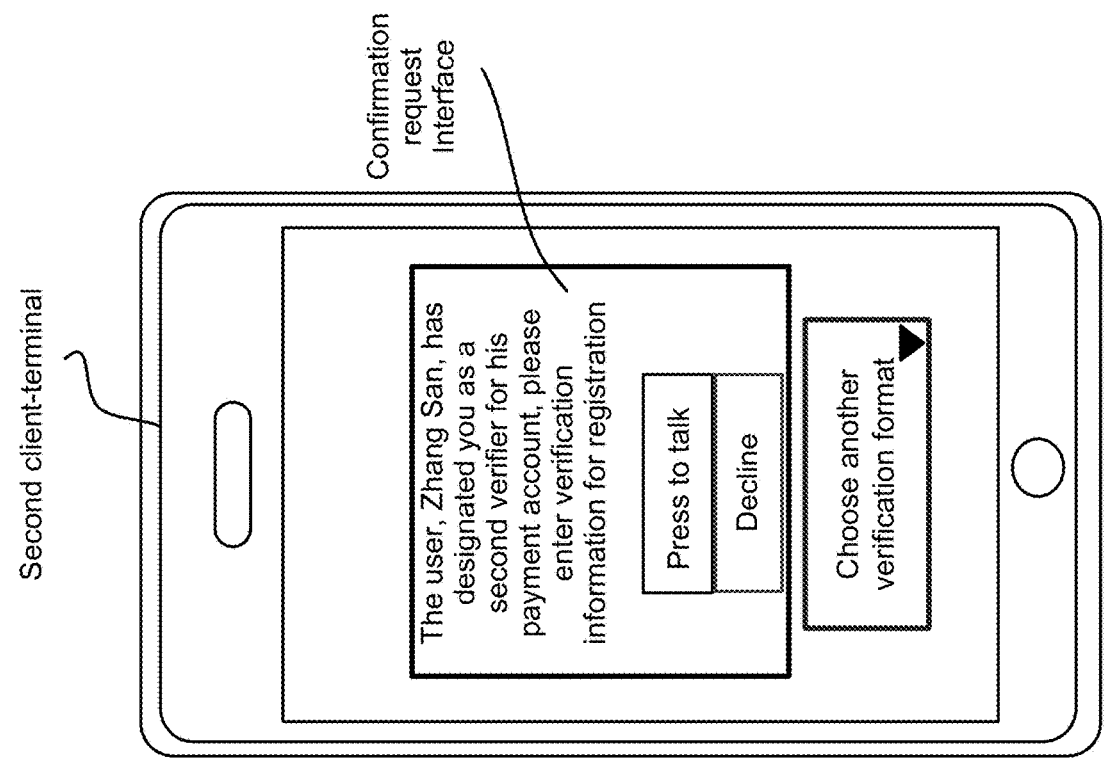
FIGS. 4A and 4B are exemplary user interfaces of the second client-terminal during the registration process according to some embodiments.
Figure 4A:
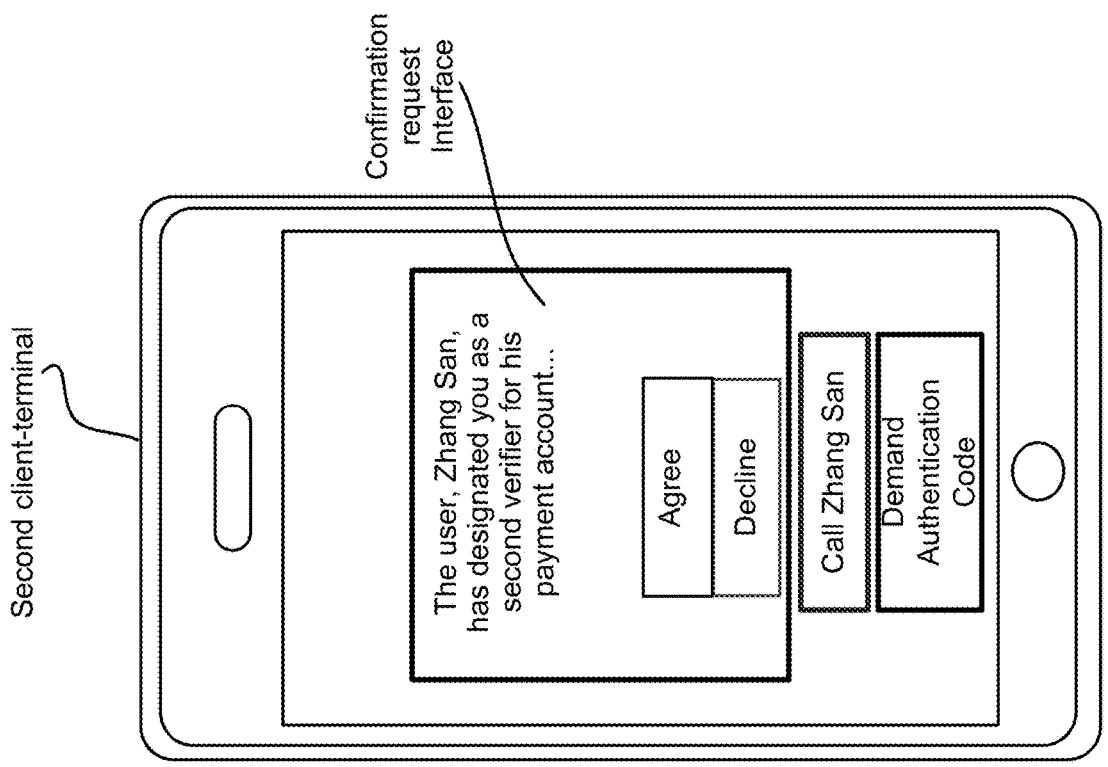

In some embodiments, as shown in FIG. 4A, the terminal device associated with the second user displays a confirmation request interface, which indicates in the second client-terminal that the first user has designated the second user as a second verifier for the payment account. The second user may "Agree" to be the second verifier, "Decline" to be the second verifier, "Call" the first user, or "Demand authentication code" from the server.

The options "Call Zhang San" and "Demand authentication code" serve as examples that the second user may choose to request further verification from the first user and/or from the server that he/she is dealing with a legitimate request. From the second user's perspective, a request that suddenly appears on his/her terminal device without prior notice may seem suspicious. Therefore, the second user may want to verify the request by calling the first user before making a decision as to whether to be a second verifier. In addition, the second user may also ask the server to provide an authentication code submitted by the first user. An authentication code may have been provided to the second user by the first user through messages, in person, emails, phone calls, by a prior agreement, or other means. Thus, when the server extracts the authentication code from the registration request and sends the code to the second user; the second user may compare the code from the server with the code from the first user and determine whether the server is making a legitimate request. After the second user determines that the confirmation request is not scam, he/she can continue with the registration process.

It should be noted that the specific design of the interfaces and buttons herein presented may be modified according to the specific needs of the users and the convenience/security requirements. For example, the server may send a confirmation request to the second user together with a request that the second user enter verification information.

As shown in FIG. 4B, the terminal device associated with the second user displays a confirmation request interface, which indicates in the second client-terminal that the first user has designated the second user as a second verifier for the payment account and asks the second user to enter verification information for registration. The second user may agree to be the second verifier and "press to talk" to enter voice information as the verification information; the second user may also "decline" to become the second verifier; and the second user also agree to be the second verifier but "choose another verification format." The "choose another verification format" button may include a drop-down menu (indicated by the triangle at the corner of the button) that allows the second user to choose verification formats from a list, such as but not be limited to: scan fingerprint, e.g. left index finger, scan retina or iris, enter pass code, and other verification formats related or unrelated to biometrics of the second user.

In some embodiments, the first user and the second user enter the same type of verification information, e.g. voice information. In some embodiments, the first user and the second user enter different types of verification information, e.g. voice information for the first user and pass code for the second user. In some embodiments, the first user and/or the second user may choose more than one type of verification information.

It should be noted that for the embodiment shown in FIG. 4B, the interface may still further include options for the second user to choose to contact the first user and/or demand further confirmation from the server, as shown in FIG. 4A.

There may be more than two verifiers. In some embodiments, the multi-user verification account may have three or more verifiers that are tiered or ranked. In some embodiments, the verifiers are ranked and the highest ranking verifier may serve as the second verifier. When a verifier is not available, the next ranking verifier may serve in its place. In some embodiments, the verifiers are tiered and the tiers are ranked, and the second verifier is selected from the next ranking tier. Having more than two verifiers may reduce the problem that the verification cannot be successfully conducted because the second verifier is not available or does not have access to the Internet. In some embodiments, the verification may require more than two verifiers. For example, in some embodiments, the transaction can only be completed when the server receives verification information from three verifiers and all the verification information is consistent with the respective verification information submitted by the verifiers during the registration process.

After receiving the respective second verification information from the at least one second user, the server may save the second registration information entered by the second user in association with the multi-user verification account, establishing the first user as the primary verifier and the at least one second user as at least one additional verifier for online transactions associated with the multi-user verification account. In some embodiments, the server may identify the first user not as the primary verifier but as a second or third verifier, whereas the at least one second user is identified as the primary verifier.

After the registration process is completed, the server and the client devices may be ready to verify the multi-user verification account for transactions.

As shown in step S601 of FIG. 8, the server may receive a verification request from a first user.

In some embodiments, the verification request may comprise transaction information for a pending online transaction and first verification information. The verification request may be used for any transaction or function as long as the transaction request results in a verification process related to certain accounts. In some embodiments, the transaction information of the verification request is related to a pending online transaction. For example, the pending online transaction may be a financial transaction. For example, the financial transaction may be related to a purchase of certain merchandise or service by the first user. The first verification information may include information such as but not limited to: password or other pass code related to an account, physiological biometric verification information related to an authorized user of an account, and other information related to the verification of an account. The physiological biometric verification information, as indicated above, may be any information related to biometrics such as but not limited to: finger print, iris, face features, voice print, nucleotides such as DNA, palm print, hand geometry, retina, and odor/scent.

In some embodiments, the transaction information may identify a multi-user verification account specifying the first user as a primary verifier and at least one second user as at least one additional verifier for the pending online transaction. As indicated above, the multi-user verification account may be a registered payment account that has been registered with the server as an account that require multi-user verification for all or selected forms of transactions. In addition to accounts related to financial transactions, the multi-user verification account may be any account that requires a higher level of security. In some embodiments, the multi-user verification account may be an account that requires more than one layer of verification, wherein the verification information is provided by more than one user.

In some embodiments, the multi-user verification account stores respective verification information for the first user and the at least one second user. As indicated above, the registered multi-user verification account may store respective verification information that is accessible by the user and the stored respective verification information can be used to compare with the verification information specifically submitted in a verification request for a transaction.

As shown in step S602 of FIG. 8, in response to the verification request from the first user, the server may request additional confirmation for the pending online transaction from the at least one second user based on the multi-user verification account.

In some embodiments, the server may first identify the multi-user verification account based on information included in the verification request. Then, the server may send a confirmation request to the at least one second user, asking the second user to confirm the transaction. As indicated above, the second user and first user may be distinct persons. In some embodiments, the second user may be selected from a number of registered users that may serve as verifiers.

In some embodiments, the server may send the confirmation request without verifying the first verification information. For such implementations, the server may verify the first verification information and second verification information to be submitted by the second user after the first verification information and second verification information are all properly gathered. On the other hand, the server may also conduct verification of the first verification information before sending out the confirmation request to the second user. For example, the server may compare the first verification information submitted by the first user for the online transaction to the respective verification information from the first user during the registration process. If the verification is successful, the server may send the confirmation request to the second user. In such implementation, the server avoids disturbing the second user when the first verification information cannot be verified successfully. When the first verification information cannot be verified successfully, the server may notify the first user to re-submit the first verification information or ask the first user to re-submit the verification request.

The confirmation request to the second user may include a number of information items. In some embodiments, the confirmation request may include the transaction information so that the second user is informed as to what transaction is pending. In addition, the confirmation request may notify the second user about the first user, who initiated the verification process.

As shown in step S603 of FIG. 8, the server may receive second verification information from the at least one second user, wherein the second verification information is provided in response to the request for additional confirmation from the server.

As indicated above, the first verification information and the second verification information may take the same or different forms. And the first user and/or the second user may choose to submit different forms of first verification information and second verification information.

As shown in step S604 of FIG. 8, the server may verify the pending online transaction in accordance with a comparison of the first and second verification information against the respective verification information stored in association with the multi-user verification account.

As shown in FIG. 3A, FIG. 3B, FIG. 1-2 and FIG. 5-7, and also referring to FIGS. 4A and 4B, the second user may approve or deny the transaction. For approval, the second user may need to enter the second verification information so that the multi-user verification account can be fully verified. In some embodiments, the submission of the second verification information implies that the second user approves the transaction. However, in some embodiments, the second user may also deny the transaction. If the comparison of the first and second verification information against the respective verification information stored with the multi-user verification account shows that the verification information is consistent, the server may conduct the transaction based on the transaction information included in the verification request. Similarly, for any other type of verification request related to any other types of transaction, the server may conduct the transaction when the verification of the transaction is successful.

In some embodiments, the second user may deny the confirmation request without entering the second verification information. Alternatively, the second user may deny the confirmation request and enter the second verification information, wherein the server may terminate the transaction based on the second user's denial and the second verification information. In some implementations, the server may receive an approval or a denial of the pending online transaction from the second user along with the second verification information from the at least one second user and the server may deny the pending transaction if the second verification information comprises a denial of the pending online transaction and if the second verification information passes the comparison. When the verification fails, the server may not complete the transaction even if the response from the second user includes an approval. When the verification fails or when the response from the second user includes a denial, the server may terminate or suspend the transaction.

In some embodiments, when the verification is successful, the server may send a notifying message to the first user and/or the second user, in addition to the conduction of the transaction. The notifying message may indicate to the first user and/or second user that the transaction has been approved and/or finished. On the other hand, when the verification is not successful and/or the response from the second user includes a denial, the server may also send a notifying message to the first user and/or the second user, in addition to the termination and/or suspension of the transaction. In the case of a suspension, the server may also prompt the second user to enter the verification information again.

As indicated above, there may be more than two verifiers. In some embodiments, there may be more than one second verifier. For example, for the second user there may be at least one group of alternative verifiers where each user included in a respective group of alternative verifiers is allowed to provide the additional verification on behalf of the respective group. In some embodiments, the server may select, randomly or according to a predetermined rule, one verifier from the group as the second verifier and send the confirmation request to this verifier. When the selected verifier is unavailable or declines to provide the verification information, the server may select another verifier from the group to continue the verification process.

Figure 9:
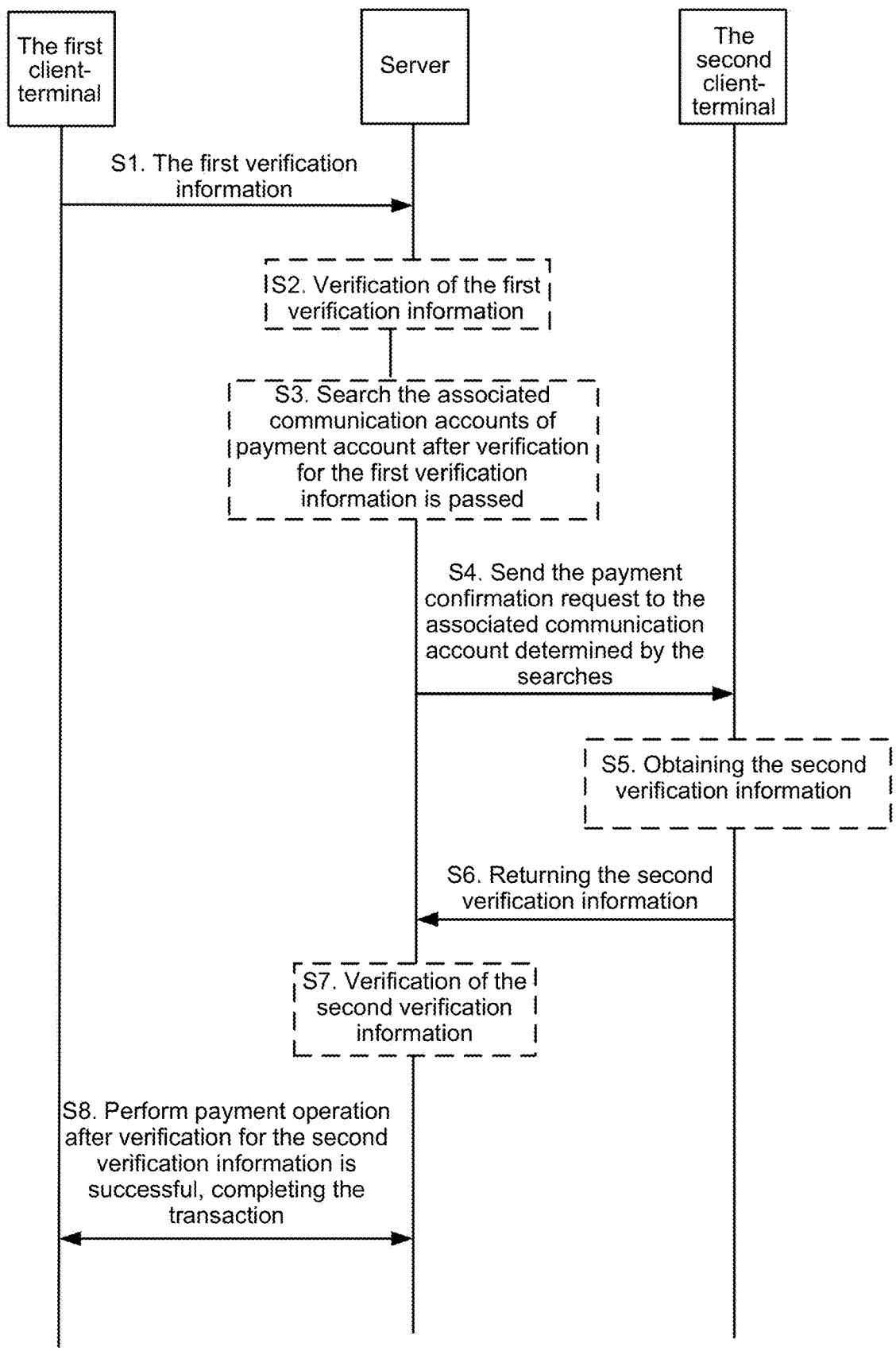
FIG. 9 is a schematic illustration of an information verification method, showing how a first client-terminal, a second client-terminal, and a server interact according to some embodiments.

Referring to FIG. 9, which is a schematic illustration of an information verification method, showing how a first client-terminal, a second client-terminal, and a server interact according to some embodiments of the present application. The method shown in FIG. 9 may be corresponding to embodiments and variations of the information verification method as shown in the aforementioned FIG. 1 to FIG. 8. In some embodiments, the method shown in FIG. 9 may include:

S1: The first client-terminal sends the first verification information for an online transaction to the server.

S2: The server verifies the first verification information; when the verification passes, the server may execute S3, otherwise, the server may send an error message to the first client-terminal and terminate or suspend the transaction.

S3: The server may search the associated communication accounts of the payment account after the server passes the verification for the first verification information.

S4: The server sends the payment confirmation request to the associated communication account determined by the searches;

S5: The second client-terminal obtains the second verification information from the user; the second client-terminal is the client-terminal of the associated communication account being used to verify the transaction, wherein the associated communication account may be a relevant IM application account that has been logged in, and the communication account may also be the relevant phone number that has been used.

S6: The second client-terminal returns the second verification to the server;

S7: The server verifies the second verification information; after the verification passes, the server may execute S8, otherwise, the server returns error information to the first client-terminal, and the error information indicates that the second verification information from the second client-terminal cannot be successfully verified.

S8: The server executes the payment operation after the server passes the verification for the second verification information, completing the current transaction.

FIGS. 10-14 illustrate the devices and systems that may be used to perform the methods described above. To avoid redundancy, not all the details and variations described for the method are herein included for the devices and systems. Such details and variations should be considered included for the description of the devices and systems as long as they are not in direct contradiction to the specific description provided for the devices and systems.

Figure 10:
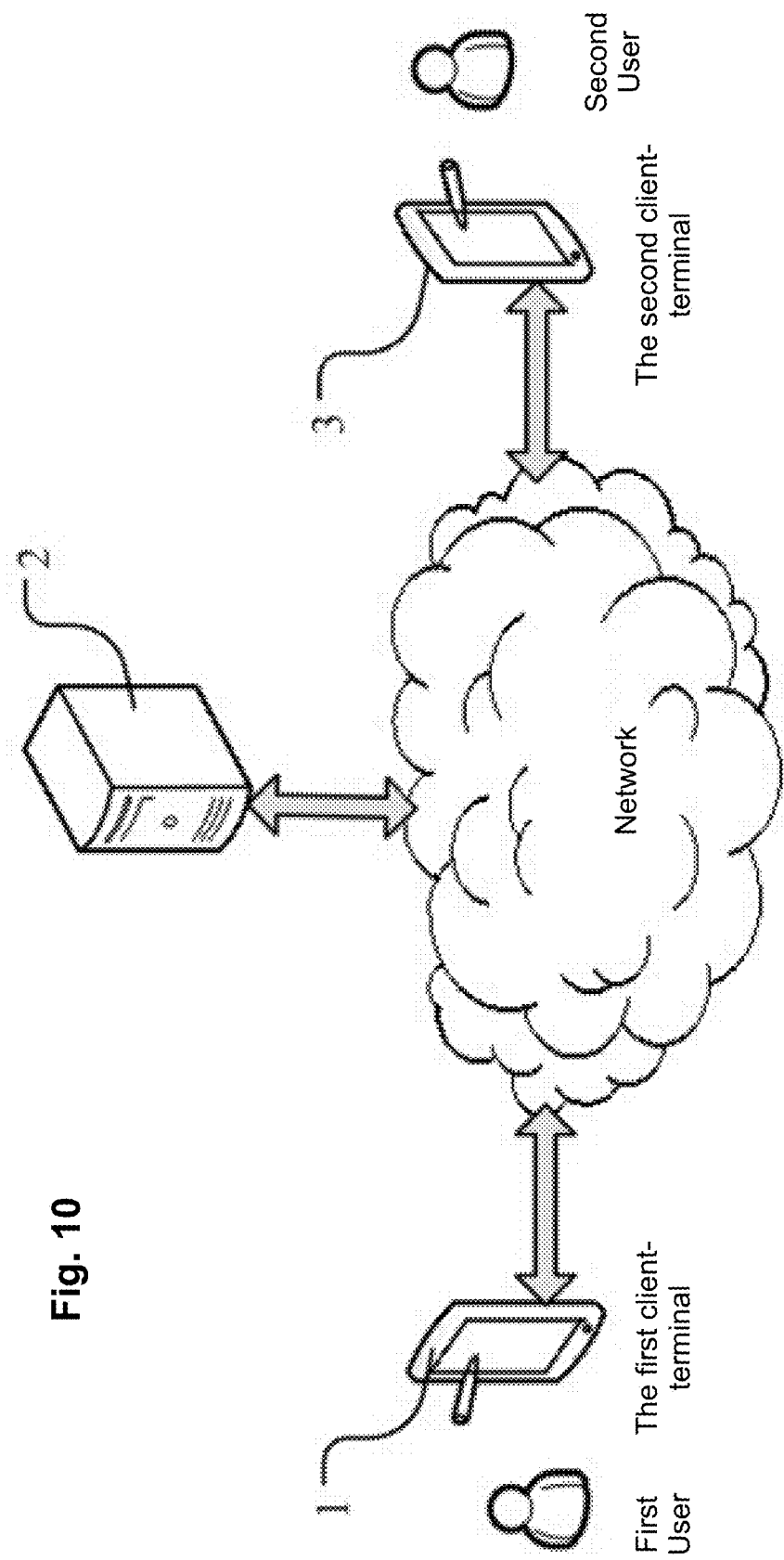
FIG. 10 is a schematic structural diagram of an information verification system in a network environment according to some embodiments.

FIG. 10 is the structural schematic view of an information verification system in accordance with some embodiments. The system includes: first client-side 1, server 2 and at least one second client-side 3. The mentioned first client-side 1 and the mentioned second client-side 3 may be in one same user terminal in some embodiments. The mentioned first client-side 1 and the second client-side 3 complete the relevant functions through the relevant application module. The functions of the first-client side 1 and the second client-side 3, and the server 2, perform respective functions described above with respect to the first client terminal, the second client terminal, and the server.

Figure 11:
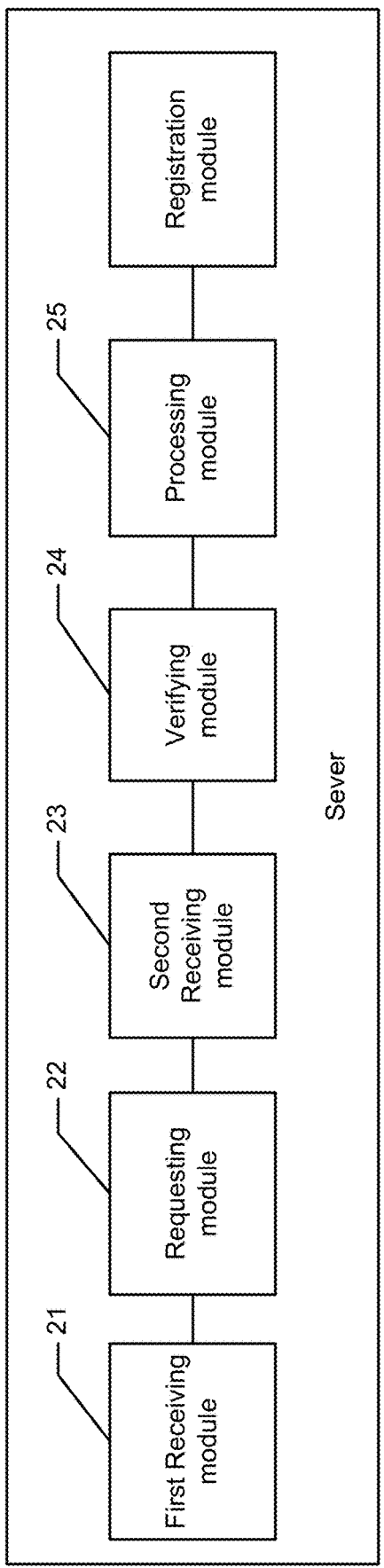
FIG. 11 is a block diagram of an information verification apparatus, such as a server, according to some embodiments.

FIG. 11 is a block diagram of an information verification apparatus, such as a server, according to some embodiments of the present application. The information verification apparatus may comprise: one of more processors; memory; and one or more programs modules stored in the memory and configured for execution by the one or more processors.

In some embodiments, the one or more program modules may include a first receiving module 21 configured to receive a verification request from a first user, wherein the verification request comprises transaction information for a pending online transaction and first verification information, wherein the transaction information identifies a multi-user verification account specifying the first user as a primary verifier and at least one second user as at least one additional verifier for the pending online transaction, and wherein the multi-user verification account stores respective verification information for the first user and the at least one second user.

In some embodiments, the one or more program modules may include a requesting module 22 configured to request additional confirmation for the pending online transaction from the at least one second user based on the multi-user verification account and in response to the verification request from the first user. In some embodiments, the pending online transaction is an online purchase transaction, and the requesting module 22 is further configured to send purchase order information associated with the online purchase transaction to the at least one second user when requesting additional confirmation for the pending online transaction from the at least one second user.

In some embodiments, the one or more program modules may include a second receiving module 23 configured to receive second verification information from the at least one second user, wherein the second verification information is provided in response to the request for additional confirmation from the server.

In some embodiments, the one or more program modules may include a verifying module 24 configured to verify the pending online transaction in accordance with a comparison of the first and second verification information against the respective verification information stored in association with the multi-user verification account.

In some embodiments, the second receiving module 23 is further configured to receive an approval or a denial of the pending online transaction from the second user along with the second verification information from the at least one second user. In addition, the verifying module 24 is configured to: verify the pending online transaction in accordance with a comparison of the first and second verification information against the respective verification information stored in association with the multi-user verification account, and deny the pending transaction if the second verification information comprises a denial of the pending online transaction and if the second verification information passes the comparison.

Furthermore, in some embodiments, the one or more program modules may further comprise a processing module 25 that is configured to mark the payment account as the multi-user verification account when a registration process is completed. Furthermore, in some embodiments, the processing module 25 is also configured to verify payment account with password submitted by the first user. In some embodiments, the processing module 25 may be configured to conduct the transaction when the verifications for the multi-user verification account are successful. For example, the processing module 25 may be further configured to conduct a financial transaction based on the transaction information when the verification of the pending online transaction is successful.

In some embodiments, the one or more program modules may further include a registration module 26 configured to register the multiple-user verification account, wherein the registration module 26 comprises: a registration receiving unit configured to receive a registration request to register the multi-user verification account from the first user, wherein the registration request includes first registration information comprising the respective verification information used to verify the first verification information received from the first user; a first saving unit configured to save the first registration information entered by the first user in association with the multi-user verification account; a contacting unit configured to contact the at least one second user to obtain second registration information from the at least one second user in response to the registration request from the first user, wherein the second registration information comprises the respective verification information used to verify the second verification information received from the at least one second user; and a second saving unit configured to save the second registration information entered by the second user in association with the multi-user verification account, establishing the first user as the primary verifier and the at least one second user as at least one additional verifier for online transactions associated with the multi-user verification account.

In some embodiments, the respective verification information stored in association with the multi-user verification account comprises respective physiological biometric information, such as voiceprint or fingerprint information, associated with the first and the at least one second user. In some embodiments, the contacting unit is further configured to prompt the second user to enter physiological biometric information as the second registration information. In some embodiments, the contacting unit is further configured to obtain an approval from the second user to register as an additional verifier for online transactions of the first user.

In some embodiments, the first user selects the at least one second user as at least one additional verifier for the multi-user verification account. In some embodiments, the server selects the at least one second user as at least one additional verifier for the multi-user verification account in accordance with predetermined rules.

In addition, in some embodiments, the registration module 26 may further comprise a registration verifying unit configured to prior to verify that the first user and the second user are distinct persons prior to establishing the first user as the primary verifier and the at least one second user as at least one additional verifier for online transactions associated with the multi-user verification account.

Figure 12:
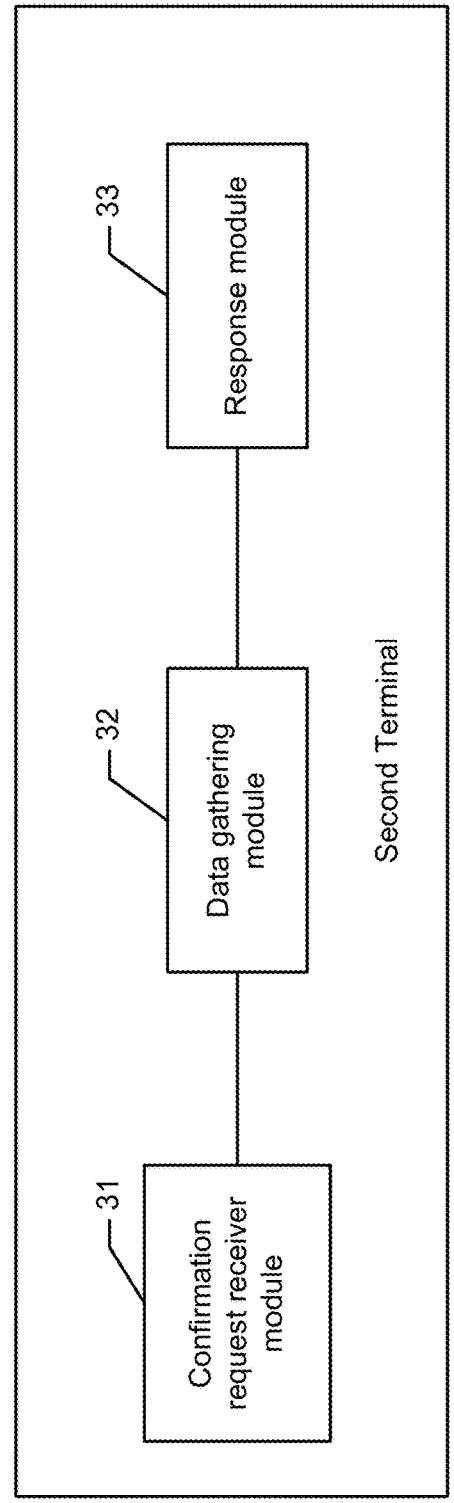
FIG. 12 is a block diagram of an information verification apparatus, such as a second terminal associated with the first client-terminal, according to some embodiments.

FIG. 12 is a block diagram of an information verification apparatus, such as a second terminal associated with the first client-terminal, according to some embodiments of the present application. The second terminal may comprise: one of more processors; memory; and one or more programs modules stored in the memory and configured for execution by the one or more processors.

In some embodiments, the one or more program modules may include a confirmation request receiver module 31, configured to receive confirmation requests from a server, wherein the confirmation request provide the transaction information related to an online transaction and asks the second user to provide second verification information for further verification.

In some embodiments, the one or more program modules may include a data gathering module 32, configured to gather data related to the second verification information from the second user. In some embodiments, the data gathered is processed before being sent to the server.

The data gathering module 32 may prompt the user of the second client-terminal to respond to the payment confirmation request through an information obtaining interface, and request the user to input the relevant verification information such as voice information. After the relevant verification information is obtained, the response module 32 may send them to the server through computer network or communication network, so as to facilitate the server to complete the verification.

In some embodiments, the one or more program modules may include a response module 33, configured to return the second verification information generated in response to the payment confirmation request to the server.

Figure 13:
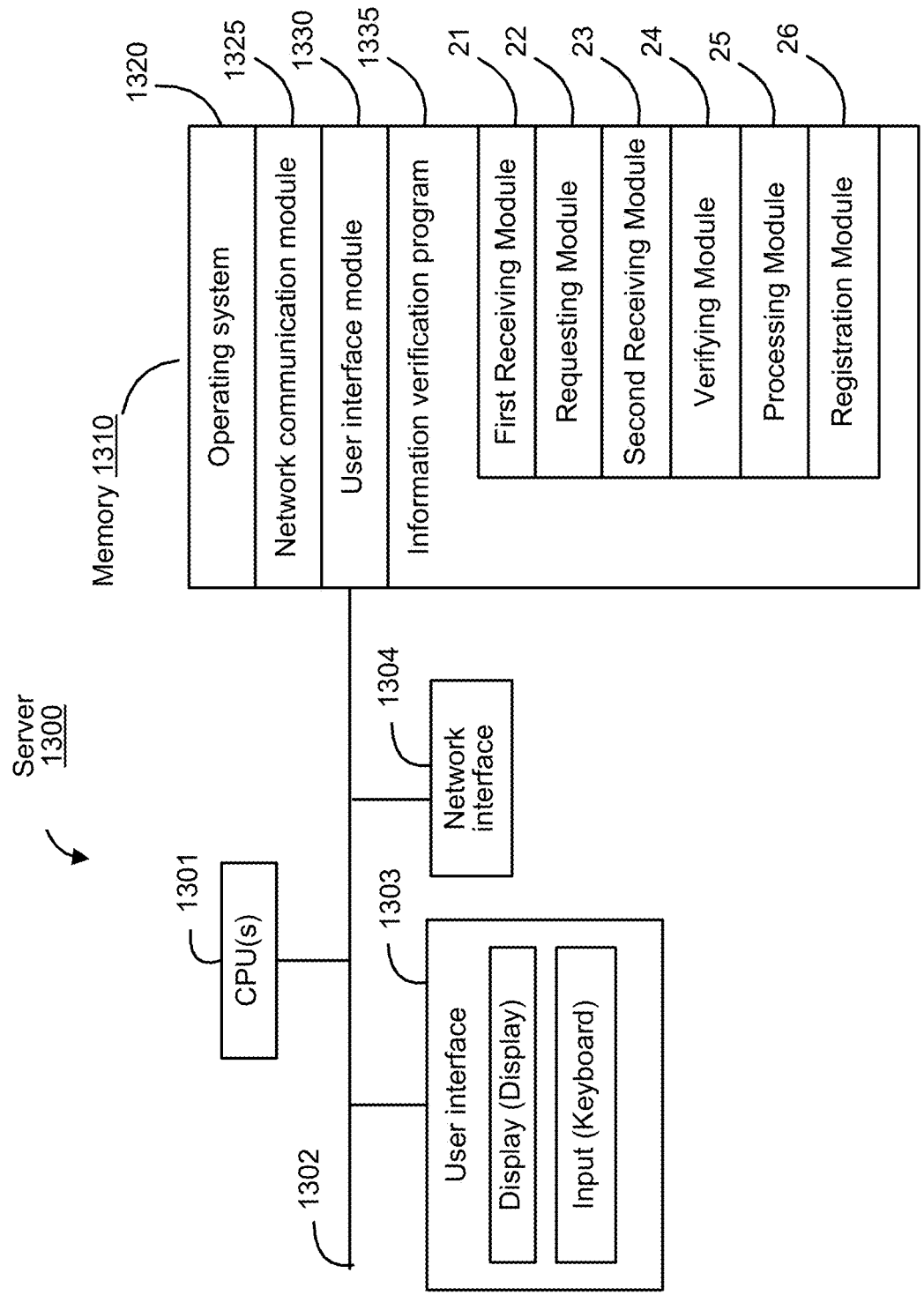
FIG. 13 is a schematic structural diagram of an information verification apparatus, such as a server, according to some embodiments.

FIG. 13 is a schematic structural diagram of an information verification apparatus, such as a server, according to some embodiments of the present application.

As shown in FIG. 13, the exemplary information paying terminal 1300 typically includes one or more processing units (CPU's) 1301, one or more network or other communications interfaces 1304, memory 1310, and one or more communication buses 1302 for interconnecting these components. The communication buses 1302 may include circuitry (sometimes called a chipset) that interconnects and controls communications between system components. The user interface 1303 may include a touch screen, or a display and a keyboard. In some embodiments, the user interface 1303 may further include a standard wired interface and wireless interface, e.g. a Wi-Fi interface. Memory 1310 may include high speed random access memory and may also include non-volatile memory, such as one or more magnetic disk storage devices. Memory 1310 may include mass storage that is remotely located from the CPU's 1301. In some embodiments, memory 1310 stores the following programs, modules and data structures, or a subset or superset thereof:

- an operating system 1320 that includes procedures for handling various basic system services and for performing hardware dependent tasks;
- a network communication module 1325 that is used for connecting the server 1300 to the client terminals and/or other computers via one or more communication networks (wired or wireless), such as the Internet, other wide area networks, local area networks, metropolitan area networks, and so on;
- a user interface module 1330 configured to receive user inputs through the user interface 1303;

and one or more information verification programs 1335 including a number of server-side application modules such as the following:

a first receiving module 21 configured to receive a verification request from a first user, wherein the verification request comprises transaction information for a pending online transaction and first verification information, wherein the transaction information identifies a multi-user verification account specifying the first user as a primary verifier and at least one second user as at least one additional verifier for the pending online transaction, and wherein the multi-user verification account stores respective verification information for the first user and the at least one second user;

a requesting module 22 configured to request additional confirmation for the pending online transaction from the at least one second user based on the multi-user verification account and in response to the verification request from the first user;

a second receiving module 23 configured to receive second verification information from the at least one second user, wherein the second verification information is provided in response to the request for additional confirmation from the server;

a verifying module 24 configured to verify the pending online transaction in accordance with a comparison of the first and second verification information against the respective verification information stored in association with the multi-user verification account;

a processing module 25 configured to conduct the transaction based on the transaction information when the verification of the pending online transaction is successful; and a registration module 26 configured to register the multiple-user verification account.

Figure 14:
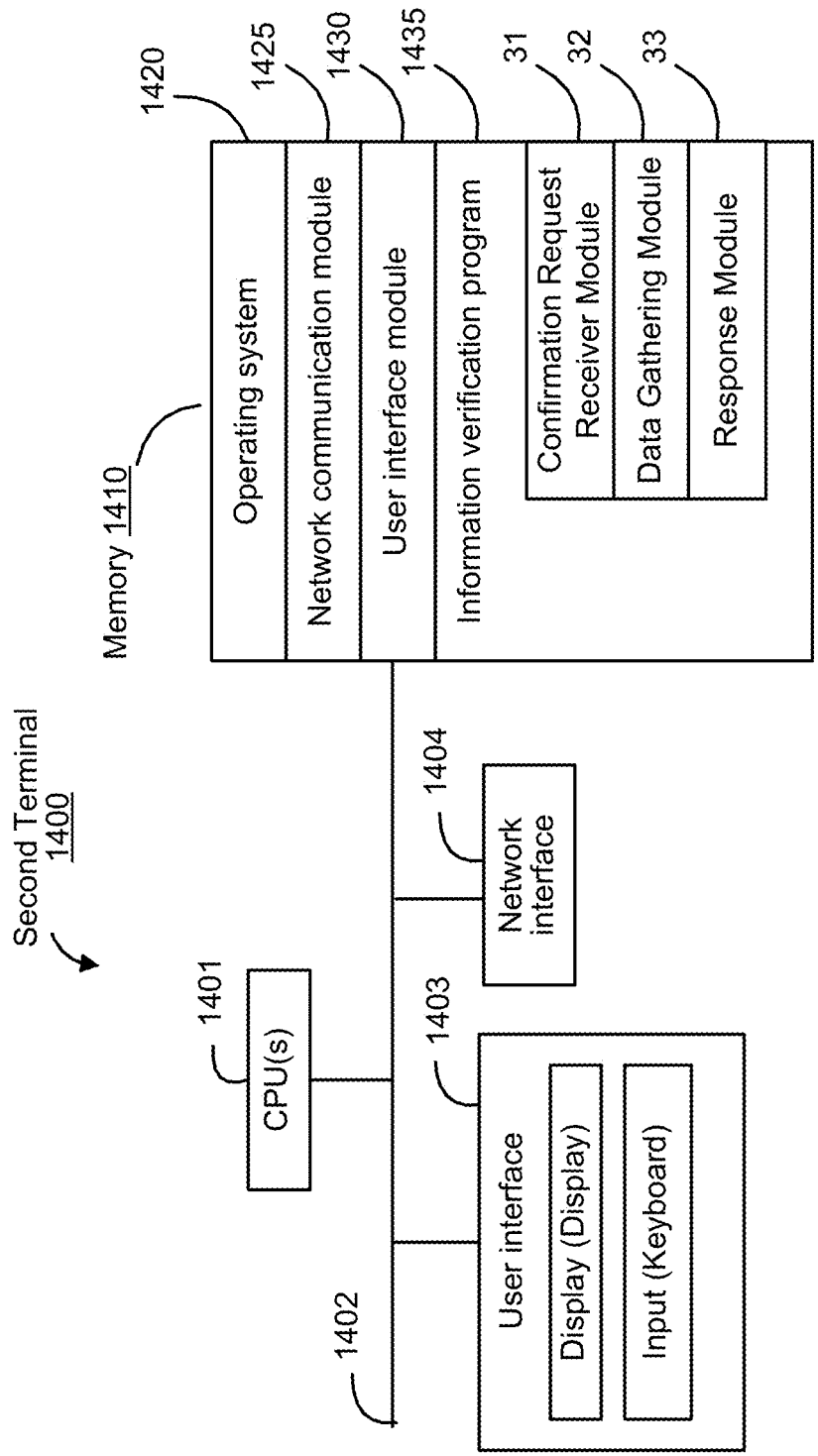
FIG. 14 is a schematic structural diagram of another information verification apparatus, such as a second terminal associated with the first client-terminal, according to some embodiments.

FIG. 14 is a schematic structural diagram of another information verification apparatus, such as a second client terminal, according to some embodiments of the present application.

As shown in FIG. 14, the exemplary second client-terminal 1400 typically includes one or more processing units (CPU's) 1401, one or more network or other communications interfaces 1404, memory 1410, and one or more communication buses 1402 for interconnecting these components. The communication buses 1402 may include circuitry (sometimes called a chipset) that interconnects and controls communications between system components. The user interface 1403 may include a touch screen, or a display and a keyboard. In some embodiments, the user interface 1403 may further include a standard wired interface and wireless interface, e.g. a Wi-Fi interface. Memory 1410 may include high speed random access memory and may also include non-volatile memory, such as one or more magnetic disk storage devices. Memory 1410 may include mass storage that is remotely located from the CPU's 1401. In some embodiments, memory 1410 stores the following programs, modules and data structures, or a subset or superset thereof:

an operating system 1420 that includes procedures for handling various basic system services and for performing hardware dependent tasks;

a network communication module 1425 that is used for connecting the second client terminal 1400 to the server and/or other computers via one or more communication networks (wired or wireless), such as the Internet, other wide area networks, local area networks, metropolitan area networks, and so on;

a user interface module 1430 configured to receive user inputs through the user interface 1403;

and one or more information verification programs 1435 including a number of terminal-side application modules such as the following:

a confirmation request receiver module 31 configured to receive confirmation requests from a server, wherein the confirmation request provide the transaction information related to an online transaction and asks the second user to provide second verification information for further verification;

a data gathering module 32, configured to gather data related to the second verification information from the second user. In some embodiments, the data gathered is processed before being sent to the server; and a response module 33, configured to return the second verification information generated in response to the payment confirmation request to the server.

Although some of the various drawings illustrate a number of logical stages in a particular order, stages that are not order dependent may be reordered and other stages may be combined or broken out. While some reordering or other groupings are specifically mentioned, others may be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method of verifying an electronic transaction, the method comprising:

at a server associated with an instant messaging (IM) application, the IM application having a plurality of IM accounts, including first and second accounts associated with first and second users, respectively:

receiving, from a first electronic device running the IM application, a first instant message including: (i) transaction information for a pending electronic transaction initiated by the first user, the transaction information identifying the first IM account and a payment account linked to the first IM account, (ii) first biometric information associated with the first user, wherein the first user controls the first electronic device, and (iii) an authentication code;

comparing the first biometric information against first reference biometric information associated with the first user, the first reference biometric information being electronically stored at the server in association with the first IM account;

in response to the first biometric information passing the comparison:

determining that the second IM account is also linked with the payment account;

sending, to a second electronic device running the IM application, the authentication code previously sent from the first electronic device, and a second instant message including a request for second biometric information associated with the second user in response to said determining, wherein the second user controls the second electronic device;

receiving, from the second electronic device in response to the request and in response to verifying the authentication code, a third instant message including: (i) second biometric information associated with the second user, and (ii) a denial, specified by the second user through the second electronic device, to be performed by the server in association with the pending electronic transaction;

comparing the second biometric information against second reference biometric information associated with the second user, the second reference biometric information being electronically stored at the server in association with the second IM account; and in response to the second biometric information passing the comparison, denying the pending electronic transaction as specified by the second user and sending, to the first electronic device running the IM application, a fourth instant message including a denial of the pending electronic transaction.

2. The method of claim 1, wherein the request, when received by the second electronic device, causes the second electronic device to display an interface of the IM application for inputting: (i) the second biometric information associated with the second user, and (ii) the denial to be performed by the server in association with the pending electronic transaction.

3. The method of claim 2, wherein the second electronic device generates the third instance message in response to the second user inputting the second biometric information and the denial through the interface of the IM application.

4. The method of claim 1, wherein determining that the second IM account is linked with the payment account is performed using a mapping table.

5. The method of claim 1, wherein the second instant message further includes purchase order information associated with the pending electronic transaction.

6. The method of claim 1, wherein:
the first biometric information associated with the first user includes a voiceprint of the first user; and
the second biometric information associated with the second user includes a different voiceprint of the second user.

7. The method of claim 1, further comprising, at the server:
in response to the first biometric information not passing the comparison, denying the pending electronic transaction; and/or
in response to the second biometric information not passing the comparison, denying the pending electronic transaction.

8. A server associated with an instant messaging (IM) application, the server comprising:
one or more processors; and
memory storing instructions, the instructions, when executed by the one or more processors, cause the server to:
receive, from a first electronic device running the IM application, a first instant message including: (i) transaction information for a pending electronic transaction initiated by a first user, the transaction information identifying a first IM account of the IM application associated with the first user, and a payment account linked to the first IM account, (ii) first biometric information associated with the first user, wherein the first user controls the first electronic device, and (iii) an authentication code;

compare the first biometric information against first reference biometric information associated with the first user, the first reference biometric information being electronically stored at the server in association with the first IM account;

in response to the first biometric information passing the comparison:
determine that a second IM account of the IM application is also linked with the payment account, the second IM account being associated with a second user;

send, to a second electronic device running the IM application, the authentication code previously sent from the first electronic device, and a second instant message including a request for second biometric information associated with the second user in response to said determining, wherein the second user controls the second electronic device;

receive, from the second electronic device in response to the request and in response to verifying the authentication code, a third instant message including: (i) second biometric information associated with the second user, and (ii) a denial, specified by the second user through the second electronic device, to be performed by the server in association with the pending electronic transaction;

compare the second biometric information against second reference biometric information associated with the second user, the second reference biometric information being electronically stored at the server in association with the second IM account; and in response to the second biometric information passing the comparison, deny the pending electronic transaction as specified by the second user and send, to the first electronic device running the IM application, a fourth instant message including a denial of the pending electronic transaction.

9. The server of claim 8, wherein the request, when received by the second electronic device, causes the second electronic device to display an interface of the IM application for inputting: (i) the second biometric information associated with the second user, and (ii) the denial to be performed by the server in association with the pending electronic transaction.

10. The server of claim 9, wherein the second electronic device generates the third instance message in response to the second user inputting the second biometric information and the denial through the interface of the IM application.

11. The server of claim 8, wherein determining that the second IM account is linked with the payment account is performed using a mapping table.

12. The server of claim 8, wherein the second instant message further includes purchase order information associated with the pending electronic transaction.

13. The server of claim 8, wherein the instructions, when executed by the one or more processors, further cause the server to:

in response to the first biometric information not passing the comparison, deny the pending electronic transaction; and/or in response to the second biometric information not passing the comparison, deny the pending electronic transaction.

14. A non-transitory computer readable storage medium, storing one or more programs configured for execution by one or more processors of a server associated with an instant messaging (IM) application, the one or more programs including instructions, which when executed by the one or more processors, cause the storage system to:

receive, from a first electronic device running the IM application, a first instant message including: (i) transaction information for a pending electronic transaction initiated by a first user, the transaction information identifying a first IM account of the IM application associated with the first user, and a payment account linked to the first IM account, (ii) first biometric information associated with the first user, wherein the first user controls the first electronic device, and (iii) an authentication code;

compare the first biometric information against first reference biometric information associated with the first user, the first reference biometric information being electronically stored at the server in association with the first IM account;

in response to the first biometric information passing the comparison:

determine that a second IM account of the IM application is also linked with the payment account, the second IM account being associated with a second user;

send, to a second electronic device running the IM application, the authentication code previously sent from the first electronic device, and a second instant message including a request for second biometric information associated with the second user in response to said determining, wherein the second user controls the second electronic device;

receive, from the second electronic device in response to the request, and in response to verifying the authentication code, a third instant message including: (i) second biometric information associated with the second user, and (ii) a denial, specified by the second user through the second electronic device, to be performed by the server in association with the pending electronic transaction;

compare the second biometric information against second reference biometric information associated with the second user, the second reference biometric information being electronically stored at the server in association with the second IM account; and in response to the second biometric information passing the comparison, deny the pending electronic transaction as specified by the second user and send, to the first electronic device running the IM application, a fourth instant message including a denial of the pending electronic transaction.

* * * * *